US011259288B2

(12) United States Patent
Nam et al.

(10) Patent No.: US 11,259,288 B2
(45) Date of Patent: Feb. 22, 2022

(54) CONTENTION-FREE CONCURRENT PHYSICAL RANDOM ACCESS CHANNEL TRANSMISSIONS

(71) Applicant: QUALCOMM Incorporated, San Diego, CA (US)

(72) Inventors: Wooseok Nam, San Diego, CA (US); Muhammad Nazmul Islam, Littleton, MA (US); Tao Luo, San Diego, CA (US); Junyi Li, Chester, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/395,080

(22) Filed: Apr. 25, 2019

(65) Prior Publication Data
US 2020/0008188 A1 Jan. 2, 2020

Related U.S. Application Data

(60) Provisional application No. 62/693,375, filed on Jul. 2, 2018.

(51) Int. Cl.
*H04W 72/04* (2009.01)
*H04W 74/00* (2009.01)
(Continued)

(52) U.S. Cl.
CPC ....... *H04W 72/0413* (2013.01); *H04W 52/50* (2013.01); *H04W 72/046* (2013.01);
(Continued)

(58) Field of Classification Search
CPC ............. H04W 74/0833; H04W 52/50; H04W 74/0866
See application file for complete search history.

(56) References Cited

U.S. PATENT DOCUMENTS 9,609,499 B2 * 3/2017 Shukla .............. H04W 74/0833
2012/0314664 A1 12/2012 Johansson et al.
(Continued)

FOREIGN PATENT DOCUMENTS

EP 3220707 A1 9/2017

OTHER PUBLICATIONS

International Search Report and Written Opinion—PCT/US2019/029451—ISA/EPO—dated Jun. 11, 2019.
(Continued)

*Primary Examiner* — Raj Jain
(74) *Attorney, Agent, or Firm* — Arent Fox LLP

(57) ABSTRACT

In an aspect of the disclosure, a method, a computer-readable medium, and an apparatus are provided. The apparatus may transmit a first physical random access channel (PRACH) transmission that includes a first random access (RA) preamble to a base station. The apparatus may determine whether to transmit to the base station a second PRACH transmission that is concurrent with the first PRACH transmission in time, wherein the second PRACH includes a second RA preamble. The apparatus may transmit, to the base station, the second PRACH transmission that includes the second RA preamble when the second PRACH transmission is determined to be transmitted. The first RA preamble and the second RA preamble may be different, and the first RA preamble and the second RA preamble may be concurrently transmitted in a same PRACH occasion or in different PRACH occasions that overlap in time.

27 Claims, 13 Drawing Sheets

(51) Int. Cl.
*H04W 74/02* (2009.01)
*H04W 52/50* (2009.01)
*H04W 74/08* (2009.01)

(52) U.S. Cl.
CPC ..... *H04W 72/048* (2013.01); *H04W 72/0446* (2013.01); *H04W 74/004* (2013.01); *H04W 74/02* (2013.01); *H04W 74/0833* (2013.01)

(56) References Cited

U.S. PATENT DOCUMENTS

2016/0100434 A1* 4/2016 Chen .................. H04W 52/362
  370/329
2016/0295609 A1   10/2016 Vajapeyam et al.
2019/0320430 A1* 10/2019 Kim .................. H04W 74/0833
2020/0008188 A1*  1/2020 Nam .................. H04W 72/048

OTHER PUBLICATIONS

Mediatek Inc: Flexible RACH 3GPP Draft; R2-1700522 NR Flexible RACH, 3rd Generation Partnership Project (3GPP), Mobile Competence Centre; 650, Route Des Lucioles; F-06921 Sophia-Antipolis Cedex; France, vol. RAN WG2, No. Spokane, USA; Jan. 17, 2017-Jan. 19, 2017, Jan. 17, 2017, XP051211094, 3 pages, Retrieved from the Internet: URL: http://www.3gpp.org/ftp/Meetings_3GPP_SYNC/RAN2/Docs/ [retrieved on Jan. 17, 2017] section 2.3.

* cited by examiner

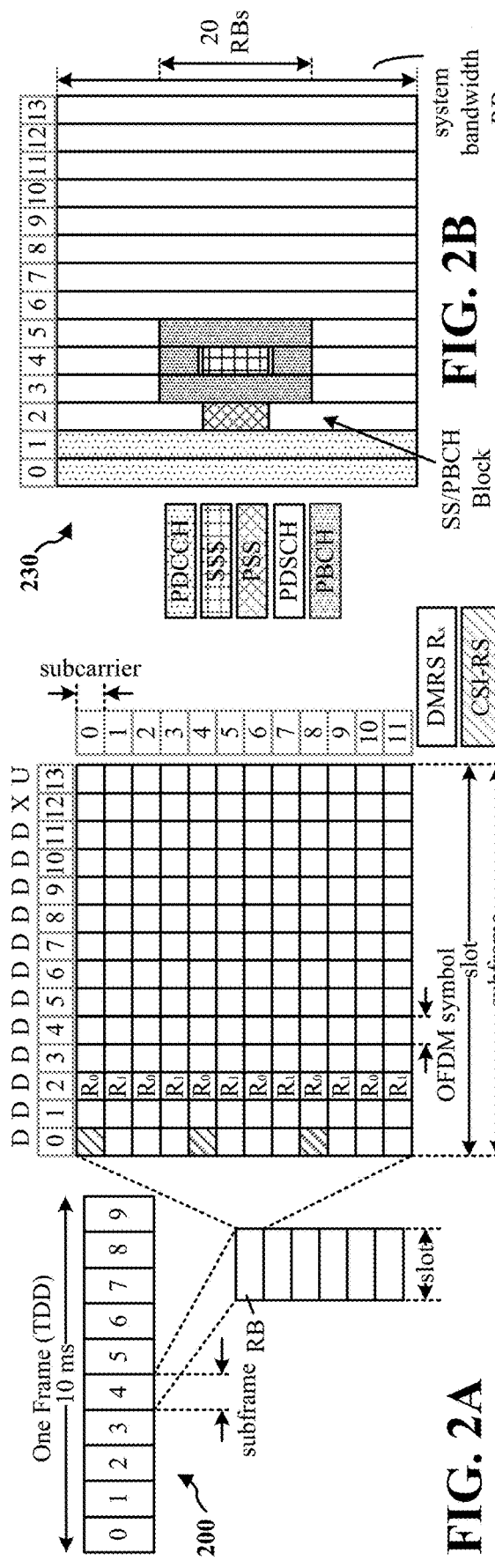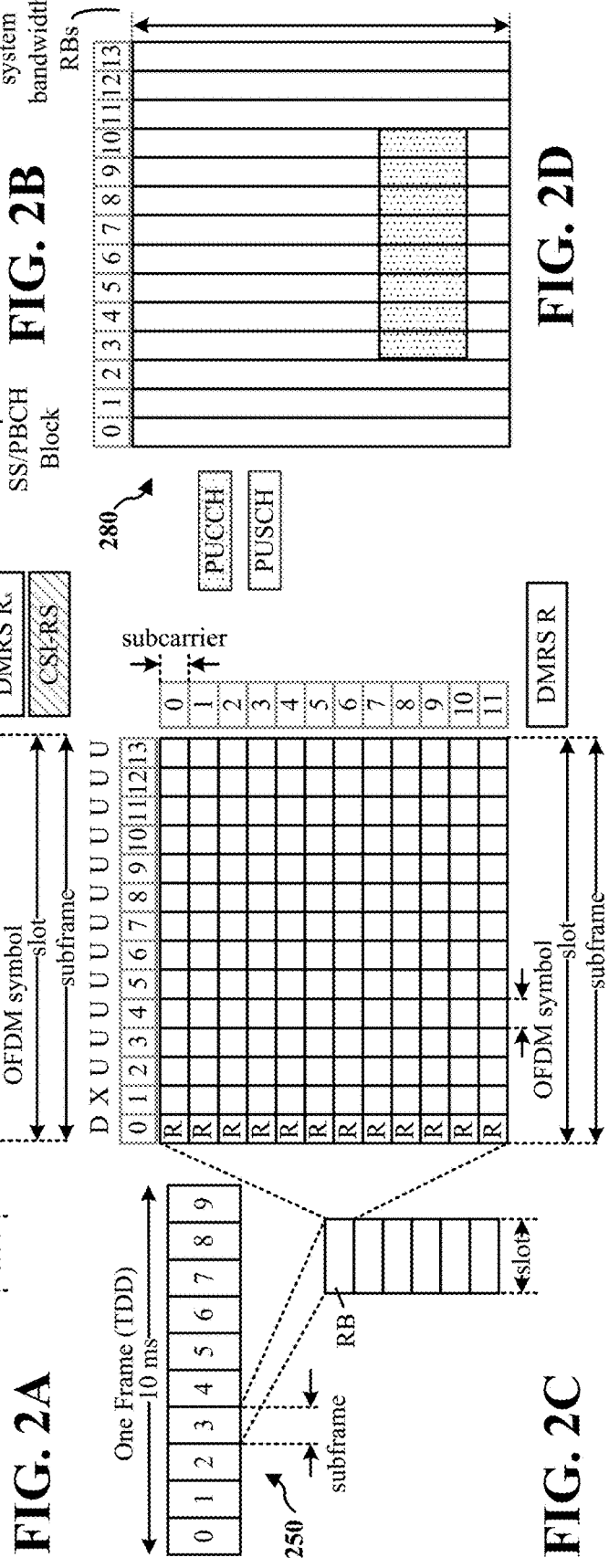

CONTENTION-FREE CONCURRENT PHYSICAL RANDOM ACCESS CHANNEL TRANSMISSIONS

CROSS REFERENCE TO RELATED APPLICATION(S)

This application claims the benefit of U.S. Provisional Application Ser. No. 62/693,375, entitled "CONTENTION-FREE CONCURRENT PHYSICAL RANDOM ACCESS CHANNEL TRANSMISSIONS" and filed on Jul. 2, 2018, which is expressly incorporated by reference herein in its entirety.

BACKGROUND

Technical Field

The present disclosure relates generally to communications systems, and more particularly, to contention-free concurrent physical random access channel (PRACH) transmissions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various radio access technologies (RATs), a random access (RA) procedure may be performed in order for a user equipment (UE) to acquire uplink timing synchronization and/or establish connection with a base station, among other reasons. An RA procedure may be contention-free or contention-based, and different conditions may cause the UE to perform either a contention-free or a contention-based RA procedure with a base station. For example, a UE may perform a contention-based RA procedure during initial access, where a UE may perform a contention-free RA procedure for recovery from a beam failure, requesting system information (SI), UE mobility, etc.

For a contention-free RA procedure, a UE may be configured with various parameters via radio resource control (RRC) signaling. For example, the UE may receive information indicating a set of time/frequency resources of a physical RA channel (PRACH) on which a RA preamble message may be transmitted. In addition, the UE may receive information indicating a RA preamble format and index, as well as a transmit power for a RA preamble message, a number of retransmissions for the RA preamble message, an RA response (RAR) window, and so forth.

One or more attempts to perform an RA procedure by the UE may fail, such as when channel conditions are poor and/or when beams between the UE and the base station are unaligned/blocked. Reattempting an RA procedure, such as by retransmitting an RA preamble message with a higher transmission power, may consume resources of the UE, including power. However, the UE may perform one RA procedure at a time, which may be controlled by a medium access control (MAC) entity of the UE in some configurations. Therefore, a need exists to improve the reliability and efficiency of RA procedures.

In an aspect of the disclosure, a method, a computer-readable medium, and an apparatus are provided. The apparatus may be a UE. The apparatus may transmit a first PRACH transmission that includes a first RA preamble to a base station. The apparatus may determine whether to transmit to the base station a second PRACH transmission that is concurrent with the first PRACH transmission in time, and the second PRACH transmission may include a second RA preamble.

In one aspect, the apparatus may transmit the second PRACH transmission that includes the second RA preamble to the base station. The first RA preamble and the second RA preamble may be different, and the first RA preamble and the second RA preamble may be concurrently transmitted in a same RACH occasion or in different RACH occasions that overlap in time.

In one aspect, the first PRACH transmission and the second PRACH transmission may be associated with different RA preamble indices, or the first PRACH transmission and the second PRACH transmission may be associated with different transmission beams.

In one aspect, the apparatus may receive a configuration for multiple concurrent PRACH transmissions. The configuration may include at least one of an indication that the multiple concurrent PRACH transmissions are allowed for the apparatus, a number of the multiple concurrent PRACH transmissions that is allowed for the apparatus, a set of preamble indices configured for the multiple concurrent PRACH transmissions, and a transmission power for the multiple concurrent PRACH transmissions. In one aspect, the configuration is based on at least one of a UE capability or UE assistance information.

In one aspect, the apparatus may determine whether to concurrently transmit the first PRACH transmission and the second PRACH transmission based at least in part on one or more channel conditions or a power state of the apparatus. In one aspect, the one or more channel conditions include at least one of a reference signal receive power (RSRP) of one or more reference signals received from the base station or a pathloss estimate.

In one aspect, the first PRACH transmission is transmitted using a first spatial beam beamformed using a first antenna subarray, and the second PRACH transmission is transmitted using a second spatial beam beamformed using a second antenna subarray. In one aspect, the first antenna subarray is associated with a first polarization, the second antenna subarray is associated with a second polarization, and the first antenna subarray and the second antenna subarray are associated with a same antenna module. In one aspect, the first antenna subarray is associated with a first antenna module, the second antenna subarray is associated with a second antenna module, and the first antenna module and the second antenna module face different directions.

In one aspect, the first PRACH transmission and the second PRACH transmission are beamformed using a same spatial beam. In one aspect, the apparatus may determine a link quality of a first spatial beam or a second spatial beam is less than or equal to a link quality threshold, and may determine which of the first spatial beam or the second spatial beam has a highest link quality by measuring a first downlink reference signal associated with the first spatial beam and a second downlink reference signal associated with the second spatial beam, and the same spatial beam on which the first PRACH transmission and the second PRACH transmission are beamformed is the first spatial beam or the second spatial beam with the highest link quality. In one aspect, the first PRACH transmission and the second PRACH transmission are transmitted using at least one of a same steering angle or angular width.

In one aspect, the apparatus may determine a link quality of a first spatial beam or a second spatial beam is greater than or equal to a link quality threshold, and may determine which of the first spatial beam or the second spatial beam has a highest link quality by measuring a first downlink reference signal associated with the first spatial beam and a second downlink reference signal associated with the second spatial beam, and may transition one of the first antenna subarray or the second antenna subarray to a sleep mode.

In one aspect, the apparatus may transmit a signal PRACH transmission using a single spatial beam based on the spatial beam having a link quality greater than or equal to a link quality threshold. In one aspect, the single spatial beam includes a synchronization signal (SS) and physical broadcast channel (PBCH) block (SSB) or channel state information (CSI) reference signal (CSI-RS) having an RSRP that is greater than or equal to the link quality threshold. In one aspect, the single spatial beam includes an SSB or a CSI-RS when other spatial beams have RSRPs that are less than or equal to the link quality threshold.

In one aspect, multiple reference signals (RSs) are associated with the same PRACH occasion, the first spatial beam and the second spatial beam are selected from a plurality of spatial beams based at least in part on the multiple RSs, and the multiples RSs include one or more of CSI-RSs or SSBs. In one aspect, a first PRACH occasion associated with the first spatial beam and a second PRACH occasion associated with the second spatial beam are concurrent in time, or the first RA preamble associated with the first spatial beam and the second RA preamble associated with the second spatial beam are concurrent in time.

In one aspect, a first link quality associated with the first spatial beam and a second link quality associated with the second spatial beam are both greater than or equal to an RSRP threshold. In one aspect, when a link quality associated with each of the multiple RSs is less than or equal to an RSRP threshold, any two of the multiple RSs may be selected for a concurrent message 1 (Msg1) transmission.

In one aspect, a first RSRP threshold associated with selecting multiple beams is different than a second RSRP threshold associated with selecting a single beam. In one aspect, one or more of the first PRACH transmission or the second PRACH transmission include one or more bits of an encoded message. In one aspect, the one or more bits of the encoded message conveys information associated with one or more of a buffer status report or a power headroom report.

In one aspect, the base station configures the apparatus with a first set of PRACH occasions and the first RA preamble for the first PRACH transmission, the first set of PRACH occasions and the first RA preamble are associated with a first SSB, the base station configures the apparatus with a second set of PRACH occasions and the second RA preamble for the second PRACH transmission, and the second set of PRACH occasions and the second RA preamble are associated with a second SSB.

In one aspect, the first set of PRACH occasions and the second set of PRACH occasions overlap in the time domain. In one aspect, the encoded message is conveyed based at least in part on a selection from the first set of PRACH occasions and the second set of PRACH occasions. In one aspect, the base station configures the apparatus with a first set of preambles for a first beam associated with the first PRACH transmission and a second set of preambles for a second beam associated with the second PRACH transmission, and the encoded message is conveyed based at least in part upon a selection from the first set of preambles and the second set of preambles.

In one aspect, the apparatus may further receive a first RA response (RAR) associated with the first PRACH transmission from the base station, and receive a second RAR associated with the second PRACH transmission from the base station. In one aspect, the first RAR includes a first physical downlink control channel (PDCCH) transmission and a first physical downlink shared channel (PDSCH) transmission which conveys the first RAR, and the second RAR include a second PDCCH transmission and a second PDSCH transmission which conveys the second RAR. In one aspect, the first RAR is received via a first beam and the second RAR is received via a second beam, and the first beam and the second beam are quasi-collocated with a downlink reference signal associated with a corresponding PRACH resource. In one aspect, the first RAR and the second RAR are received in a same RAR window, and the first RAR and the second RAR are time-division multiplexed (TDM) or received in an interleaved pattern within the same RAR window. In one aspect, the first RAR is received in a first RAR window and the second RAR is received in a second RAR window.

In one aspect, the apparatus may receive a single RAR associated with the first PRACH transmission and the second PRACH transmission from the base station. In one aspect, the single RAR associated with the first PRACH transmission and the second PRACH transmission is received when the first PRACH transmission and the second PRACH transmission do not include an encoded message. In one aspect, the apparatus may determine whether a PRACH procedure is successfully based at least in part on either the first RAR or the second RAR.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
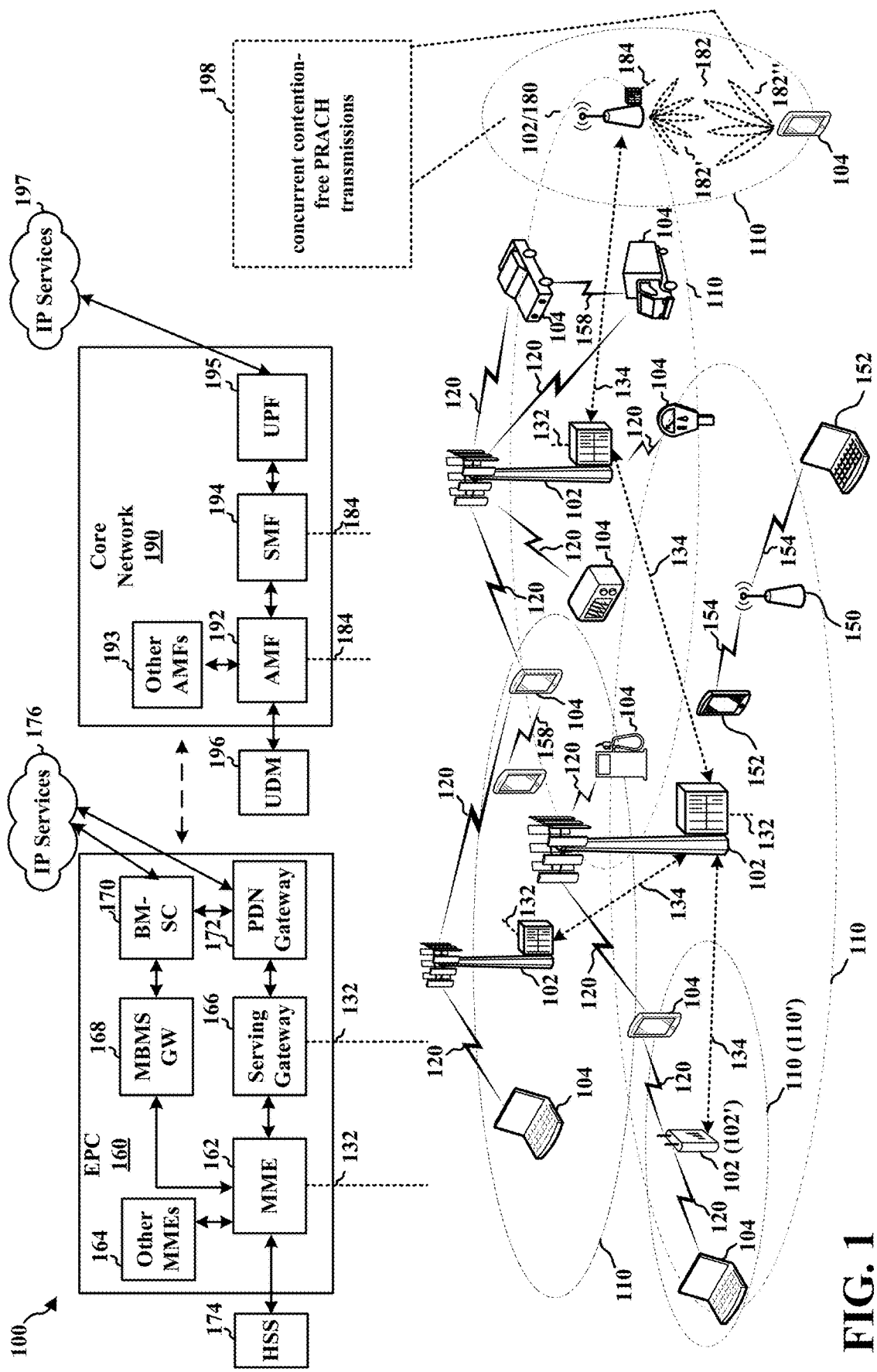
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG- RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit a first physical random access channel (PRACH) transmission that includes a first random access (RA) preamble to a base station 102/180. Further, the UE 104 may determine whether to transmit, to the base station 102/180, a second PRACH transmission that is concurrent with the first PRACH transmission. The second PRACH transmission may include a second RA preamble. In one aspect, the first RA preamble may be different from the second RA preamble. When the UE 104 determines that the UE 104 is to transmit the second PRACH transmission, the UE 104 may concurrently transmit the first PRACH transmission and the second PRACH transmission (198). According to various aspects, the concurrent transmission of at least the first PRACH transmission and the second PRACH transmission may at least partially overlap in time. Thus, the first and second PRACH transmissions are not necessarily simultaneous in order to be concurrent (although simultaneous or nearly simultaneous PRACH transmissions are possible).

Although the present disclosure and accompanying drawings may be focused on 5G New Radio (NR), the concepts described herein may be applicable to other similar areas, such as LTE, LTE-Advanced (LTE-A), Code Division Multiple Access (CDMA), Global System for Mobile communications (GSM), and/or other wireless/radio access technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
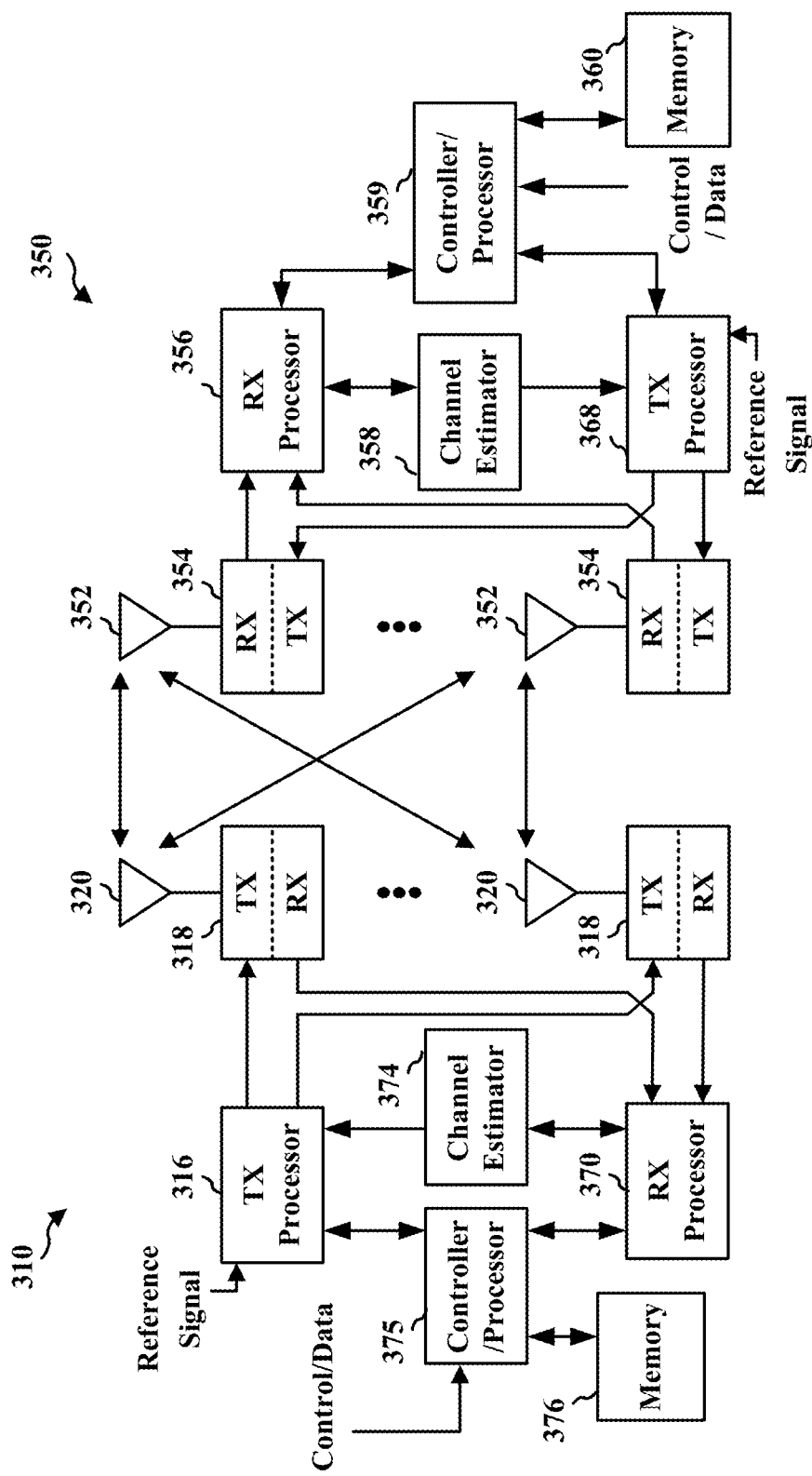
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the concurrent transmission of the first PRACH transmission and the second PRACH transmission (198) of FIG. 1. In particular, the UE 350 may be configured to transmit a first PRACH transmission that includes a first RA preamble to the base station 310.

Further, the UE 350 may be configured to determine whether to transmit, to the base station 310, a second PRACH transmission that is concurrent with the first PRACH transmission. The second PRACH transmission may include a second PRACH preamble.

The UE 350 may be configured to transmit, to the base station 310, the second PRACH transmission, including the second RA preamble when the second PRACH transmission is determined to be transmitted. In one configuration, the first RA preamble and the second RA preamble may be different, and the first RA preamble and the second RA preamble may be concurrently transmitted in the same PRACH occasion or in different PRACH occasions that overlap in time.

According to one configuration, the first PRACH transmission and the second PRACH transmission may be associated with different RA preamble indices. According to another configuration, the first PRACH transmission and the second PRACH transmission are associated with different transmission beams.

The UE 350 may be configured to received, from the base station 310, a configuration for multiple concurrent PRACH transmissions. The configuration for multiple concurrent PRACH transmissions may include at least one of an indication that the multiple concurrent PRACH transmissions are allowed for the UE 350, a number of the multiple concurrent PRACH transmissions are allowed for the UE 350, a set of preamble indices configured for the multiple concurrent PRACH transmissions, and/or a transmission power for the multiple concurrent PRACH transmissions. In some aspects, the configuration for multiple concurrent PRACH transmissions may be based on at least one of a UE capability and/or UE assistance information.

According to one configuration, the UE 350 may determine whether to concurrently transmit the first PRACH transmission and the second PRACH transmission based on at least one of one or more channel conditions and/or a power state of the UE 350. The one or more channel conditions may include at least one of a reference signal received power (RSRP) of one or more reference signals received from the base station 310 and/or a pathloss estimate.

According to one configuration, the UE 350 may transmit the first PRACH transmission using a first spatial beam beamformed using a first antenna subarray. Further, the UE 350 may transmit the second PRACH transmission using a second spatial beam beamformed using a second antenna subarray. According to another configuration, the first PRACH transmission and the second PRACH transmission may be beamformed using a same spatial beam.

In one aspect, one or more of the first PRACH transmission and/or the second PRACH transmission may include one or more bits of an encoded message. The one or more bits of the encoded message may indicate information associated with at least one of a buffer status report of the UE 350 and/or a power headroom report.

In one configuration, the UE 350 may receive, from the base station 310, a first RA response (RAR) associated with the first PRACH transmission. Further, the UE 350 may receive, from the base station 310, a second RAR associated with the second PRACH transmission. In another configuration, the UE 350 may receive, from the base station 310, a single RAR associated with the first PRACH transmission and the second PRACH transmission.

In order to communicate in a wireless communications network, a UE may perform a RA procedure with a base station. For example, the UE may perform a RA procedure with a base station for initial access, handover, beam failure recovery, and so forth. Upon successfully completing a RA procedure, a UE may acquire uplink timing synchronization and/or acquire an uplink grant with the base station.

A RA procedure may include the exchange of at least two messages between the base station and the UE. In particular, a RA procedure may be a two-step RA procedure or a four-step RA procedure. In a two-step RA procedure, the UE may transmit a first message to the base station to initiate the RA procedure, and the base station may transmit a second message to the UE in response to the first message to complete the RA procedure. In a four-step RA procedure, the UE may transmit a third message to the base station in response to the second message, and the base station may transmit a fourth message to the UE in response to the third message to complete the RA procedure.

According to various configurations, a UE may identify an SSB within a SS burst set transmitted by a base station. The SSB may be identified, e.g., using part of a time index carried by the PBCH DM-RS and the SSB time index carried by the PBCH data. Based on the identification of the SSB(s), the UE may determine a preferred SSB, and transmit a PRACH transmission using a set of resources on the preferred SSB time index. An association between an SSB/SS burst set and a subset of PRACH resources/random access (RA) preambles may be configured by a set of parameters in system information (SI) transmitted by the base station. The UE may notify the base station of the preferred SSB using the corresponding PRACH resource for that SSB.

In certain implementations, a UE may be configured via RRC signaling with contention-free RA (CFRA) or non-contention based RA. Use cases of contention-free RA may include, e.g., beam failure recovery, SI request, UE mobility, etc. An RA preamble transmission may be triggered, e.g., by a higher layer or by a PDCCH order from the base station. The configuration of CFRA may include any of time and/or frequency resources for a PRACH transmission, an RA preamble format and index, and/or other parameters, such as a transmit power, a number of retransmissions, an RAR window, etc.

In some configurations, a MAC entity of a UE may be enabled to perform one RA procedure at a time. The RA procedure may include transmitting a single RA preamble (e.g., Msg 1) transmission by the UE prior to the expiration of an RAR window, receiving an RAR message with a PDCCH/PDSCH (e.g., Msg 2), and, if applicable, performing contention resolution (e.g., Msg 3 and Msg 4 for a four-step RACH procedure).

The UE may transmit a single RA preamble multiple times before the expiration of the RAR window, e.g., on transmission beams of different directions. However, a mechanism may not exist that enables a UE to transmit concurrent and/or different RA preambles before the expiration of the same RAR window. In some cases, a UE may benefit by transmitting different RA preambles concurrently before the expiration of an RAR window. Concurrent transmission of multiple RA preamble may benefit a UE through power saving, addressing a lack of UE beam correspondence, and/or increasing the reliability (via multipath diversity) of a RA procedure.

The present disclosure may provide a solution to by configuring a UE to transmit multiple concurrent PRACH transmissions. Concurrent PRACH transmissions imply RA preambles transmitted in the same RACH occasion or in different frequency division multiplexed RACH occasions that overlap, at least partially, in time. Each PRACH transmission may be associated with a different RA preamble index and/or transmission beam. The configuration of multiple concurrent PRACH transmissions may depend on the UE's capability. Example parameters of the configuration for multiple concurrent PRACH transmissions may include any of an indication of whether the UE is configured for concurrent PRACH transmissions, a number of concurrent PRACH transmissions that the UE is configured to transmit, preamble indices for the multiple concurrent PRACH transmissions, transmission power for the concurrent PRACH transmissions, etc.

For example, a UE with multiple antenna modules may be configured to transmit multiple concurrent PRACH transmissions using one beam for each antenna module. The UE may determine whether to transmit multiple concurrent PRACH transmissions or a single PRACH transmission depending on certain conditions, e.g., channel conditions related to RSRP, pathloss estimate, a power state of the UE, and the like. Thus, the UE may be configured for concurrent PRACH transmissions and may determine to refrain from transmitting multiple, concurrent PRACH transmissions and to instead transmit only a single PRACH transmission.

Hence, the present disclosure may provide a solution by enabling a UE to transmit concurrent PRACH transmissions with different RA preambles in order to take advantage of, e.g., power savings and a higher reliability (via multipath diversity), and to address a lack of UE beam correspondence, e.g., as described below in connection with FIGS. 4-8.

Figure 4:
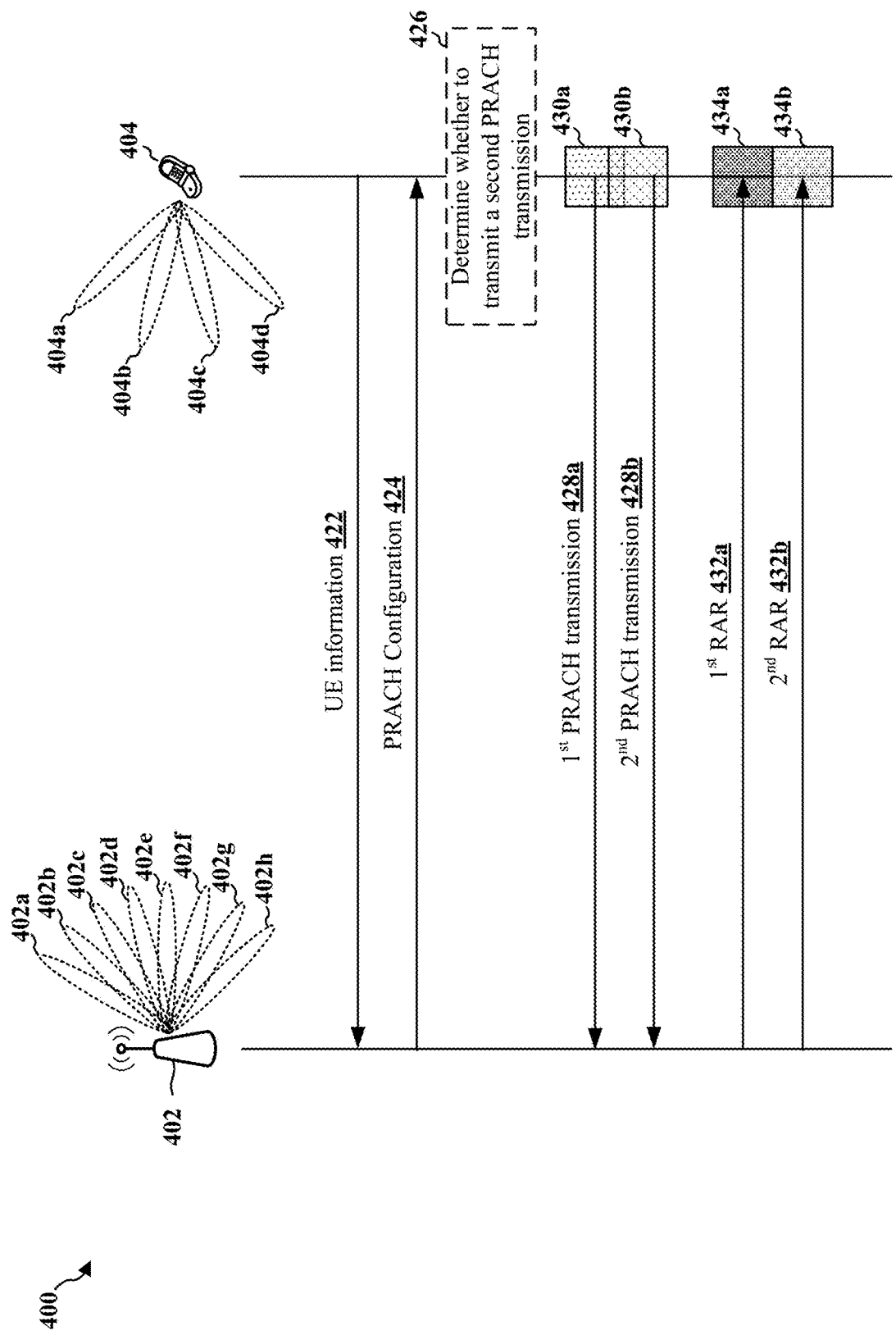
FIG. 4 is a call flow diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. In one configuration, a beamformed signal may include an SSB and/or a CSI-RS.

The UE 404 may receive the beamformed signal from the base station 402 in one or more receive directions 404a, 404b, 404c, 404d. In some configurations, the UE 404 may measure a respective signal strength (e.g., an RSRP) for each of the received beamformed signals. The UE 404 may compare each of the respective signal strengths to one another and/or to a threshold, and the UE 404 may identify a best transmit direction(s) 402a-h and/or best receive direction(s) 404a-d based on the comparison(s) of the respective signal strengths measured for each of the beamformed signals.

The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

The UE 404 and the base station 402 may perform an RA procedure, which may allow the UE 404 to acquire uplink timing synchronization and/or obtain an uplink grant with the base station 402. The UE 404 may perform an RA procedure, for example, during initial access, during handover, recovering from beam failure, and so forth.

In one configuration, the UE 404 may transmit UE information 422 to the base station 402. The UE information 422 may include a message indicating UE capability or a message indicating UE assistance information. For example, when the UE 404 is in an RRC Connected mode, the UE 404 may send UE assistance information to the base station 402 as the UE information 422. The UE information 422 may indicate power information associated with the UE 404, such as a power saving preference and/or power state. Additionally or alternatively, the UE information 422 may indicate whether the UE 404 supports concurrent PRACH transmissions.

The base station 402 may receive the UE information 422 and, the base station 402 may determine a PRACH configuration 424 for the UE 404 based on the UE information 422 (e.g., based on a UE capability or UE assistance information). The base station 402 may determine, for the PRACH configuration 424, whether multiple concurrent PRACH transmissions are allowed for the UE 404, a number of multiple concurrent PRACH transmissions allowed for the UE 404, a set of preamble indices configured for multiple concurrent PRACH transmissions by the UE 404, and/or a transmission power for the UE 404 when transmitting the multiple concurrent PRACH transmissions. The base station 402 may send the PRACH configuration 424 to the UE 404.

The UE 404 may receive the PRACH configuration 424. In one aspect, the UE 404 may determine 426 whether to transmit multiple concurrent PRACH transmissions based on the PRACH configuration 424. In another aspect, the UE 404 may determine 426 whether to transmit multiple concurrent PRACH transmissions based on one or more channel conditions and/or based on a power state of the UE 404. For example, the UE 404 may measure one or more RSRPs of one or more reference signals received in one or more receive directions 404a-404d from the base station 402 in one or more of the transmit directions 402a-402h. In another example, the UE 404 may determine a pathloss estimate based on one or more signals received in one or more receive directions 404a-404d from the base station 402 in one or more of the transmit directions 402a-402h.

If the UE 404 determines not to transmit multiple concurrent PRACH transmissions, then the UE 404 may determine to transmit one PRACH transmission. Accordingly, the UE 404 may transmit the first PRACH transmission 428a, and the UE 404 may refrain from transmitting the second PRACH transmission 428b.

Alternatively, the UE 404 may determine 426 that the UE 404 may transmit multiple concurrent PRACH transmissions based on the PRACH configuration 424. When the UE 404 determines 426 to transmit multiple concurrent PRACH transmissions, the UE 404 may determine at least a plurality of RA preambles. For example, the UE 404 may generate at least a first RA preamble and a second RA preamble based on the PRACH configuration 424. The UE 404 may generate each of the RA preambles based on a set of preamble indices, which may be included in the PRACH configuration 424. Each of the RA preambles may be different from one another.

The UE 404 may generate a respective RA preamble for each of the PRACH transmissions that the UE 404 is to concurrently transmit. For example, the UE 404 may determine the number of concurrent PRACH transmissions that the UE 404 is to transmit, for example, based on the PRACH configuration 424. As illustrated in FIG. 4, the UE 404 may transmit two PRACH transmissions; however, the UE 404 may transmit more PRACH transmissions in other configurations.

When the UE 404 determines 426 to transmit multiple concurrent PRACH transmission, the UE 404 may transmit the first PRACH transmission 428a and may transmit the second PRACH transmission 428b. The UE 404 may transmit each of the first and second PRACH transmissions 428a, 428b with a transmission power that may be indicated by the PRACH configuration 424.

The UE 404 may include the first RA preamble in the first PRACH transmission 428a, and the UE 404 may include the second RA preamble in the second PRACH transmission 428b. In one aspect, when the first RA preamble is different from the second RA preamble, the first PRACH transmission 428a may be associated with a different RA preamble index than the second PRACH transmission 428b.

As the first and second PRACH transmission 428a, 428b are to be concurrent, the UE 404 may transmit the first and second PRACH transmissions 428a, 428b in a same RA occasion 430a, according to one configuration. In another configuration, the UE 404 may concurrently transmit the first and second PRACH transmissions 428a, 428b by transmitting the first PRACH transmission 428a in a first RA occasion 430a and transmitting the second PRACH transmission 428b in a second RA occasion 430b—however, the first and second RA occasions 430a, 430b may at least partially overlap in time.

The UE 404 may determine a respective one of the beam directions 404a-404d through which to transmit each of the first and second PRACH transmissions 428a, 428b. In one configuration, the first PRACH transmission 428a may be associated with a different one of the beam directions 404a-404d than the second PRACH transmission 428b. For example, the UE 404 may transmit the first PRACH transmission 428a in a first beamformed direction 404a using a first spatial beam generated at a first antenna subarray of the UE 404, and the UE 404 may transmit the second PRACH transmission 428b in a second beamformed direction 404b using a second spatial beam generated at a second antenna subarray of the UE 404. In another configuration, the UE 404 may transmit the first and second PRACH transmissions 428a, 428b in the same beamformed direction (e.g., direction 404a) using the same spatial beam.

According to some aspects, the UE 404 may include one or more bits of an encoded message in the first PRACH transmission 428a and/or the second PRACH transmission 428b. The one or more bits may indicate at least one of a buffer status report or a power headroom report. Accordingly, the UE 404 may indicate at least a buffer status report and/or a power headroom report using multiple concurrent PRACH transmissions 428a, 428b.

The base station 402 may receive at least one of the first and second PRACH transmissions 428a, 428b. In response to the at least one of the first and second PRACH transmissions 428a, 428b, the base station 402 may generate at least one RAR 432a. The base station 402 may include an uplink timing advance and/or an uplink grant in the at least one RAR 432a. The base station 402 may include a PDCCH and/or PDSCH in the RAR.

In some configurations, the base station 402 may generate a respective RAR for each received PRACH transmission. Thus, the base station 402 may generate a first RAR 432a in response to the first PRACH transmission 428a, and the base station 402 may generate a second RAR 432b in response to the second PRACH transmission 428b. The base station 402 may send the first RAR 432a in a first RAR window 434a, and the base station 402 may send the second RAR 432b in a second RAR window 434b.

In another configuration, the base station 402 may be configured to send a single RAR in response to each of the multiple concurrent PRACH transmissions by a single UE. Thus, when the base station 402 receives the first and second PRACH transmissions 428a, 428b, the base station 402 may generate the first RAR 432a. The base station 402 may send the first RAR 432a in the first RAR window 434a.

The UE 404 may monitor for RARs in at least one RAR window 434a. In some configurations, the UE 404 may be configured to monitor a respective RAR window for each PRACH transmission. Accordingly, the UE 404 may monitor in a first RAR window 434a for the first RAR 432a responsive to the first PRACH transmission 428a, and the UE 404 may monitor in a second RAR window 434b for the second RAR 432b responsive to the second PRACH transmission 428b.

In another configuration, the UE 404 may monitor for a single RAR for all multiple concurrent PRACH transmissions. Thus, the UE 404 may monitor in the first RAR window 434a for the single RAR 432a responsive to the first and second PRACH transmissions 428a, 428b.

Based on monitoring in the first RAR window 434a, the UE 404 may receive at least the first RAR 432a. If the base station 402 is configured to respond to each PRACH transmission with a respective RAR, the UE 404 may also receive the second RAR 432b based on monitoring in the second RAR window 434b. From the first RAR 432a and/or the second RAR 432b, the UE 404 may acquire an uplink timing advance and/or obtain an uplink grant with the base station 402.

FIGS. 5A-5E illustrate various aspects of multiple concurrent PRACH transmissions. Thus, the UE 404 may transmit the first PRACH transmission 428a and the second PRACH transmission 428b according to one or more configurations described herein.

Figure 5A:
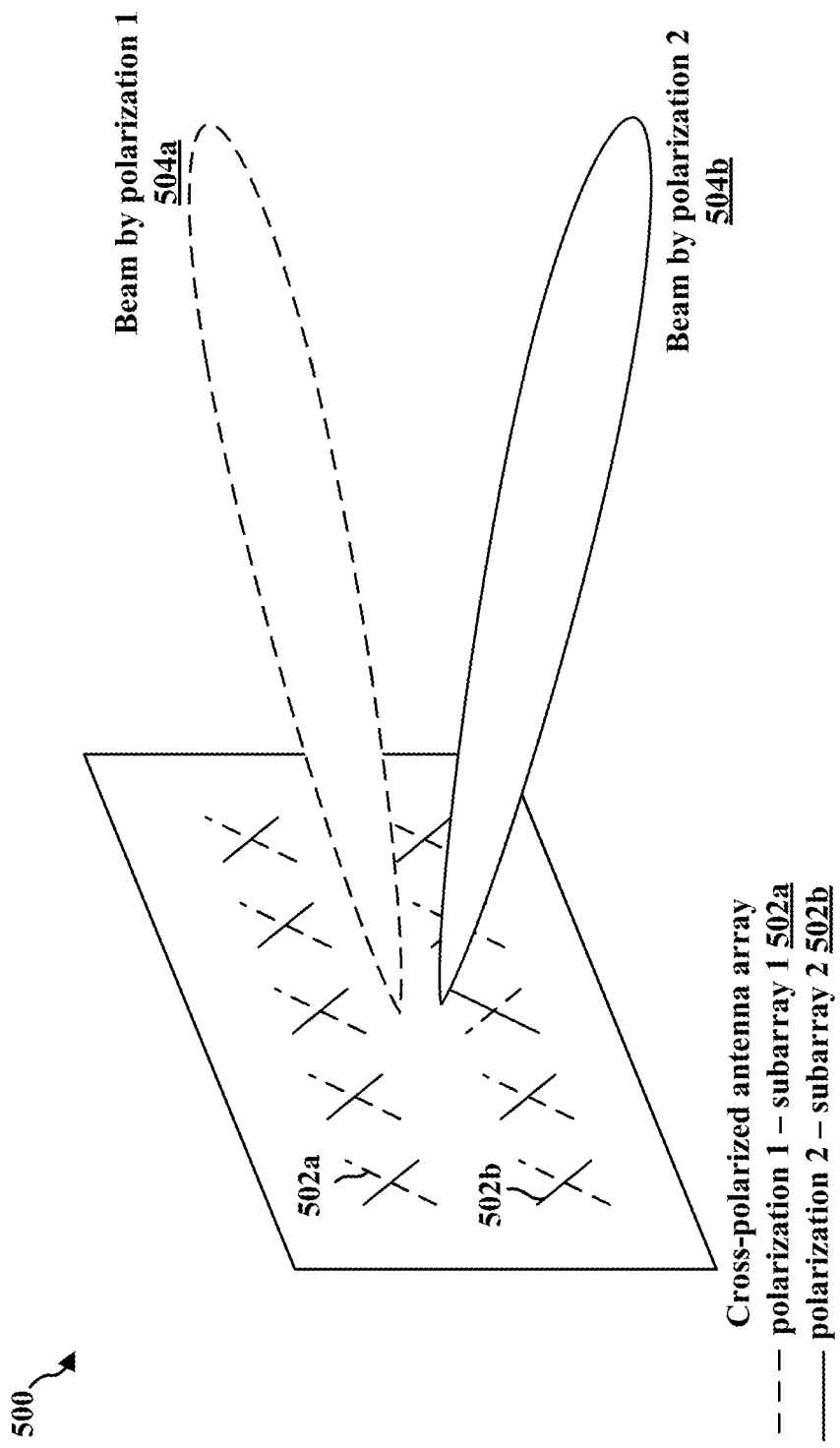
FIG. 5A is a diagram illustrating one aspect of a UE with a cross-polarized antenna array that may be used to transmit concurrent physical random access channel (PRACH) transmissions using different spatial beams.

FIG. 5A is a diagram illustrating a UE 500 with a cross-polarized anteanna array that may be used to transmit concurrent PRACH transmissions using different spatial beams in accordance with certain aspects of the disclosure. The UE 500 may correspond to, e.g., the UE 104, 350, 404, 515, 550, the apparatus 702/702'.

As illustrated in FIG. 5A, the UE 500 may include two antenna subarrays 502a and 502b that may be independently beamformed and used to transmit concurrent PRACH transmissions. In certain configurations, the first antenna subarray 502a may have a first polarization (e.g., horizontal polarization), and the second antenna subarray 502b may have a second polarization (e.g., vertical polarization). The two antenna subarrays 502a, 502b may be located in the same antenna module at the UE 500. For example, an antenna module at the UE 500 may include a transceiver (e.g., a mmW radio transceiver), an RF frontend, a power management integrated circuit (IC), and the antenna subarrays 502a, 502b.

A first PRACH transmission may be associated with a first beam 504a that is beamformed using the first antenna subarray 502a with the first polarization. A second PRACH transmission may be associated with a second beam 504b that is beamformed using the second antenna subarray 502b with the second polarization. The first PRACH transmission and the second PRACH transmission may include different RA preambles, and may be transmitted concurrently by the first antenna subarray 502a and the second antenna subarray 502b.

Figure 5B:
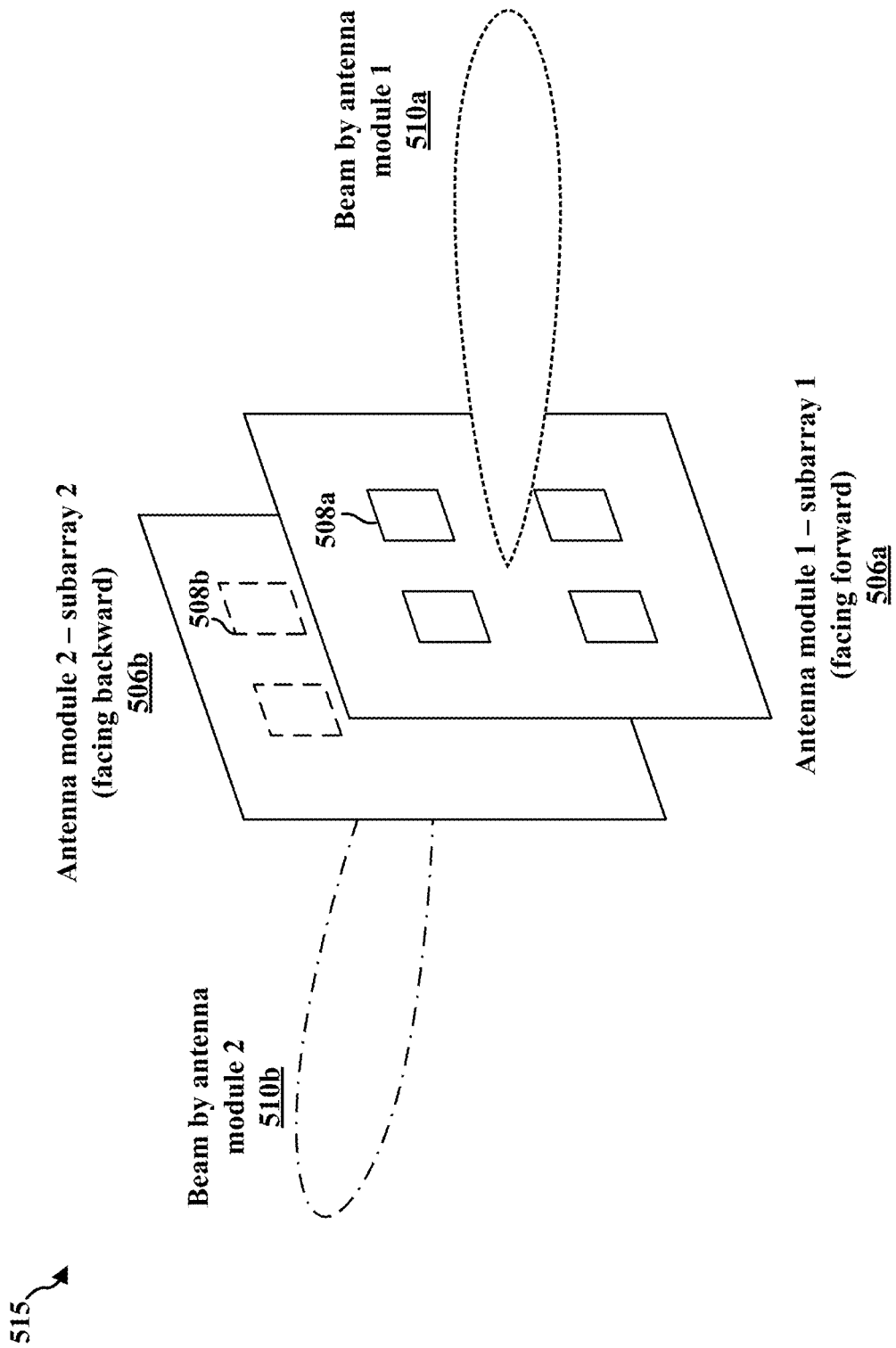
FIG. 5B is a diagram illustrating one aspect of a UE with antenna arrays that are located in different antenna modules facing opposite directions that may be used to transmit concurrent PRACH transmissions using different spatial beams.

FIG. 5B is a diagram illustrating a UE 515 with anteana arrays that are located in different anteanna modules 506a, 506b facing in different directions that may be used to transmit concurrent PRACH transmissions using different spatial beams in accordance with certain aspects of the disclosure. For example, the antenna modules are illustrated as facing in opposite directions. The UE 515 may correspond to, e.g., the UE 104, 350, 404, 500, 550, the apparatus 702/702'.

As illustrated in FIG. 5B, the UE 515 may include a first antenna module 506a that includes a first antenna subarray 508a, and a second antenna module 506b that includes a second antenna subarray 508b.

A first PRACH transmission may be associated with a first beam 510a that is beamformed using the first antenna subarray 508a at the first antenna module 506a. A second PRACH transmission may be associated with a second beam 510b that is beamformed using the second antenna subarray 508b at the second antenna module 506b. The first PRACH transmission and the second PRACH transmission may include different RA preambles, and may be transmitted concurrently by the first antenna subarray 508a and the second antenna subarray 508b.

Figure 5C:
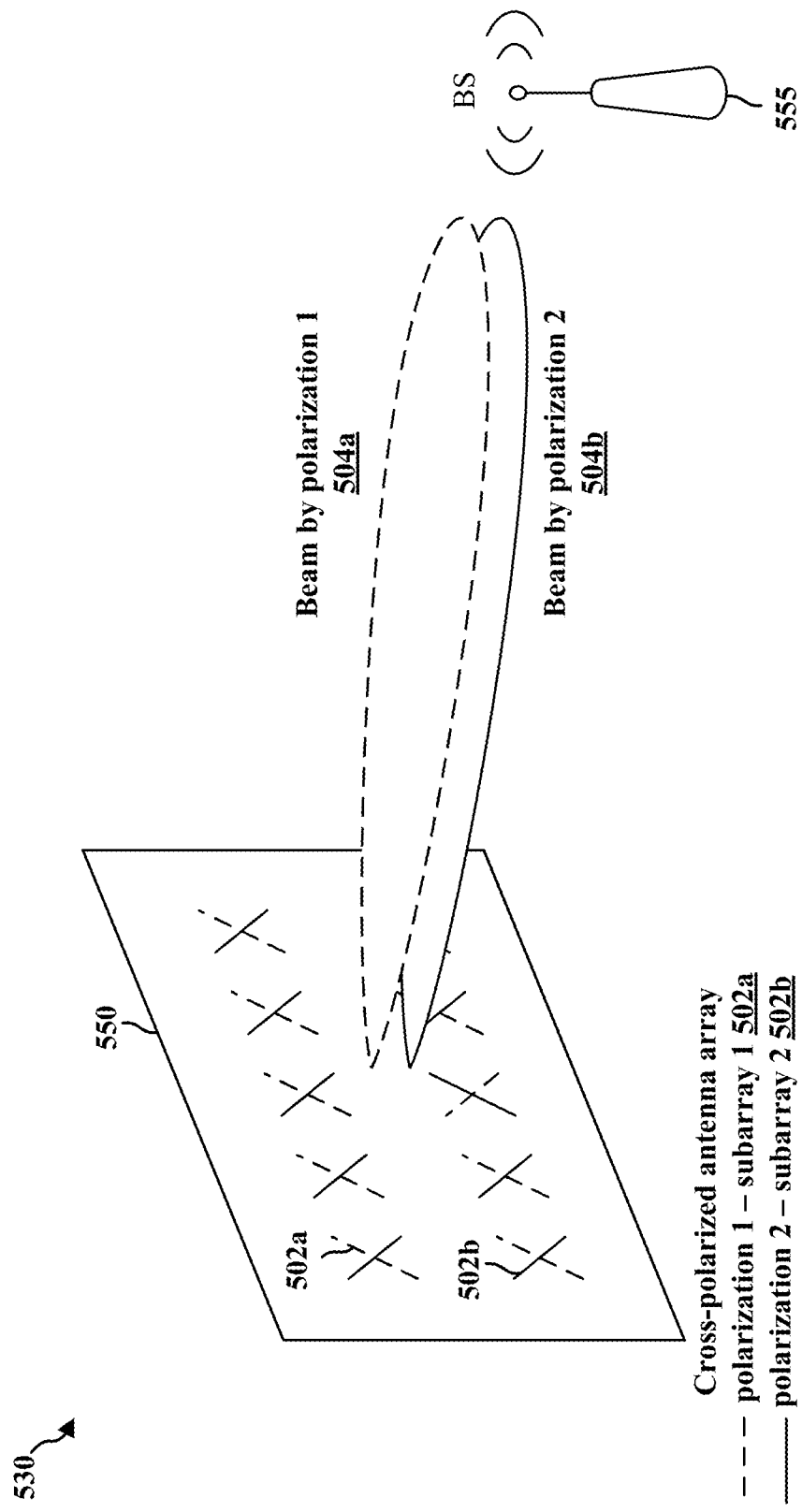
FIG. 5C is a diagram illustrating one aspect of a UE with a cross-polarized antenna array that may be used to transmit concurrent PRACH transmissions using the same spatial beam.

FIG. 5C is a diagram illustrating a wireless communication system 530 in which a UE 550 with a cross-polarized antenna array that may be used to transmit concurrent PRACH transmissions to a base station 555 using the same spatial beam in accordance with certain aspects of the disclosure. The UE 550 may correspond to, e.g., the UE 104, 350, 404, 500, 515, the apparatus 702/702'. The base station 555 may correspond to, e.g., the base station 102, 180, 310, 402, 750.

In certain scenarios, the UE 550 may determine that a link quality (e.g., signal strength, RSSI, RSRP, etc.) of the beams illustrated in FIG. 5A may be lower than a link quality threshold. Thus, the UE 550 may determine the beam with the highest link quality by measuring the downlink reference signal (DL RS) for each beam. The UE may use concurrent PRACH transmissions in order to improve the likelihood that the base station will receive the PRACH. The UE 550 may beamform both antenna subarrays 502a, 502b using the beam with the highest link quality. Beamforming using the same beam implies that both beams 504a, 504b transmitted by both antenna subarrays 502a, 502b have the same steering angles, angular width, etc.

A first PRACH transmission may be associated with that first beam 504a that is beamformed using the first antenna subarray 502a with the first polarization. A second PRACH transmission may be associated with a second beam 504b that is beamformed using the second antenna subarray 502b with the second polarization. The first PRACH transmission and the second PRACH transmission may include different RA preambles, and may be transmitted concurrently by the first antenna subarray 502a and the second antenna subarray 502b.

Because the two beams 504a, 504b may be combined at the base station (not illustrated), additional power gain (e.g., 3 dB gain) may be attained and the range of the concurrent PRACH transmissions may be enhanced even when link quality is low.

Figure 5D:
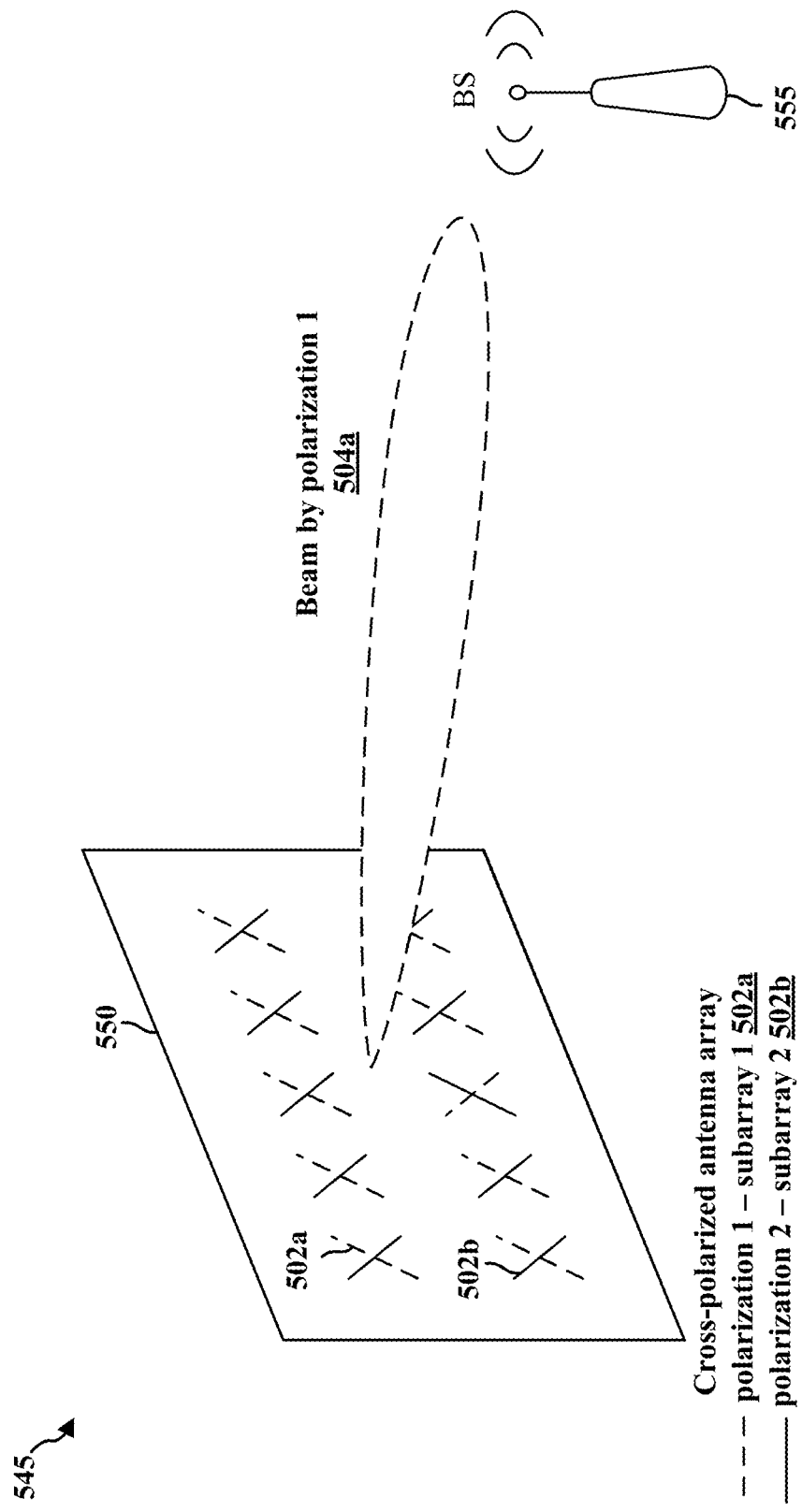
FIG. 5D is a diagram illustrating one aspect of a UE with a cross-polarized antenna array that may be used to transmit a single PRACH transmission to a base station.

FIG. 5D is a diagram illustrating a wireless communication system 545 with a UE 550 that includes cross-polarized antenna array that may be used to transmit a single PRACH transmission to a base station 555 in order to reduce power consumption, even when the UE is configured for concurrent PRACH transmissions, in accordance with certain aspects of the disclosure. The UE 550 may correspond to, e.g., the UE 104, 350, 404, 500, 515, the apparatus 702/702'. The base station 555 may correspond to, e.g., the base station 102, 180, 310, 402, 750.

As illustrated in FIG. 5D, the UE 550 may include two antenna subarrays 502a and 502b that may be independently beamformed and transmit concurrent PRACH transmissions. However, in scenarios in which the UE 550 determines that the link quality is above a link quality threshold, the UE 550 may not need to take advantage of the multipath diversity provided by concurrent PRACH transmission in order to perform a successful RA procedure. Hence, the UE 550 may determine to refrain from transmitting multiple, concurrent PRACH transmissions and may instead beamform a single antenna subarray 502a in order to transmit a single PRACH transmission using beam 504a. The UE 550 may transition the second subarray 502b to sleep mode and/or reduced power mode in order to conserve power.

The beam 504a that is selected for the single PRACH transmission may be the beam with the highest link quality and/or a suitable beam. The beam 504a with the highest link quality may be determined by measuring DL RS for each beam.

A suitable beam may refer to an SSB and/or CSI-RS whose corresponding RSRP is greater than a network configured threshold. Additionally and/or alternatively, a suitable beam may refer to a beam corresponding to any SSB and/or CSI-RS when the corresponding RSRP of all SSB and/or CSI-RS are below the network configured threshold.

Figure 5E:
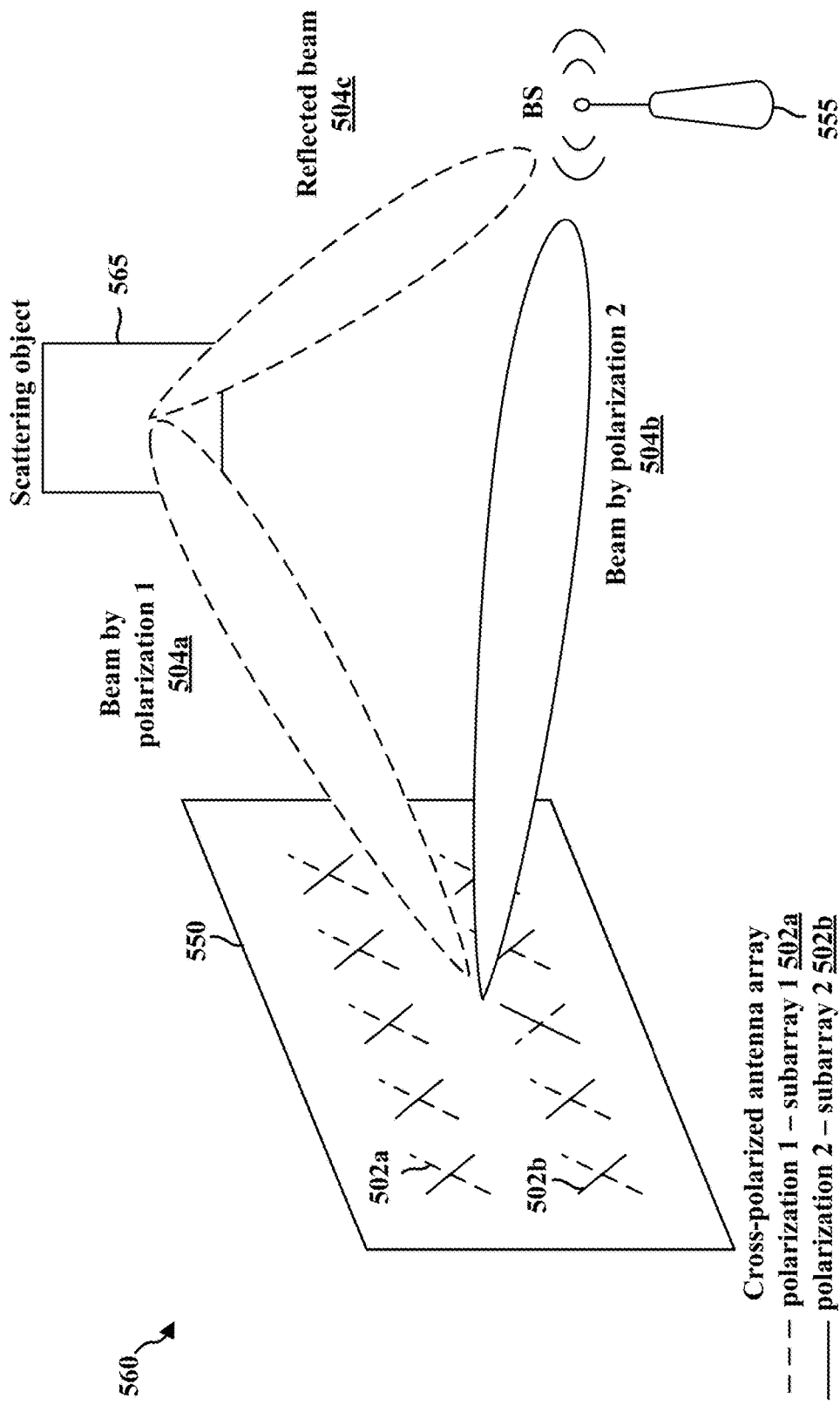
FIG. 5E is a diagram illustrating one aspect of a UE that includes a cross-polarized antenna array that may be used to transmit multiple PRACH transmissions to a base station.

FIG. 5E is a diagram illustrating a wireless communication system 560 with a UE 550 that includes cross-polarized antenna array that may be used to transmit a multiple PRACH transmissions to a base station 555 in accordance with certain aspects of the disclosure. The UE 550 may correspond to, e.g., the UE 104, 350, 404, 500, 515, the apparatus 702/702'. The base station 555 may correspond to, e.g., the base station 102, 180, 310, 402, 750.

As illustrated in FIG. 5E, the UE 550 may include two antenna subarrays 502a and 502b that may be independently beamformed and transmit concurrent PRACH transmissions.

If the UE 550 receives multiple RSs (e.g., CSI-RSs and/or SSBs) for a single RACH occasion or for multiple frequency division multiplexed RACH occasions from the base station 555, the UE 550 may be able to determine multiple beams (e.g., beam with the highest link quality and the beam with the second highest link quality) for concurrent PRACH transmissions. When the UE 550 transmits concurrent PRACH transmissions using the same PRACH occasion or multiple frequency division multiplexed PRACH occasions, the concurrent PRACH transmissions undergo different propagation paths, and hence, are more reliable and robust to beam blocking of one of the paths. When the first beam 504a scatters off the scattering object 565, the first beam 504a may be provided with a second path (e.g., the reflecting beam 504c), and hence, the chance of a successful RA procedure may be increased. The UE 550 may select two RACH occasions and/or RA preambles that overlap in the time domain.

The beams selected by the UE 550 may be referred to as suitable beams, e.g., meaning that the selected beams may satisfy an RSRP threshold configured by the network. When the RSRP corresponding to all SSBs and/or CSI-RS sent by the base station 555 are below the RSRP threshold, UE 550 might select any two SSBs and/or CSI-RS for concurrent PRACH transmissions with different RA preambles (e.g., Msg 1). The RSRP threshold configured by the network may be different when the UE 550 selects a single beam for a single PRACH transmission versus when the UE 550 selects multiple beams for concurrent PRACH transmissions. In an example, the UE may receive multiple thresholds from the network, a first threshold for multiple concurrent PRACH transmissions and a second threshold for a single PRACH transmission.

With reference to any of FIGS. 5A-8, a UE of the present disclosure may encode a message within the concurrent PRACH transmissions based on any of the PRACH resources used to carry the PRACH transmissions, the selection of the RACH occasions, and/or the selection of RA preambles, etc.

In certain configurations, the UE may encode a few bits of a message into the concurrent PRACH transmissions based on, e.g., the combination of two (or more) PRACH resources selected by the UE for transmitting the concurrent PRACH transmissions.

For example, the network may configure eight PRACH occasions (e.g., a first set of PRACH occasions) and one RA preamble for CFRA corresponding to a first SSB and/or CSI-RS. The network may also configure another eight PRACH occasions (e.g., a second set of PRACH occasions) and another RA preamble for CFRA corresponding to a second SSB and/or CSI-RS. The first and second set of RACH occasions for the first and second SSB may overlap in the time domain. Hence, the UE has sixty-four choices for PRACH occasion pairs to transmit two simultaneous PRACH transmissions, and may convey six additional bits to the network through the combined selection of a first PRACH occasion from the first set and a second PRACH occasion from the second set may convey information to the base station.

In certain other configurations, the UE may encode a few bits of a message into the concurrent PRACH transmissions based on the selection of RA preambles included in the PRACH transmission.

For example, the network may configure the UE with a set of RA preambles for each beam, e.g., corresponding to different SSBs and/or CSI-RSs. The UE may convey additional bits of a message in the PRACH transmissions based at least in part on the selection of the RA preambles. Similar to the example of two sets of PRACH occasions, the combined selection of a first RA preamble from a first set for the first beam and a second RA preamble from a second set for the second beam may convey information to the base station. In certain configurations, the message may convey information about the UE, e.g., such as buffer status report and/or a power headroom report from the UE.

Upon receipt of one or more of the concurrent PRACH transmissions, the base station may determine whether the RACH process is successful. Upon determining that the RACH process is successful, the base station may transmit one or more RARs to the UE. Once at least one RAR is received, the UE may determine that the RACH process is successful.

In certain configurations, the base station may send a separate RAR for each of the concurrent PRACH transmissions sent by the UE. For example, in the case of two concurrent PRACH transmissions, two RAR messages each with an associated PDCCH and PDSCH may be transmitted to the UE. The beam for each RAR transmission may be quasi-collocated with the DL RS (i.e., SSB and/or CSI-RS) associated with the corresponding PRACH resource of the associated PRACH transmission. If the UE is configured to receive two RAR beams concurrently, the base station may concurrently transmit the two RARs in the same RAR window. Additionally and/or alternatively, if the UE is not configured to receive multiple RAR beams concurrently, the base station may configure two RAR windows (e.g., one for each RAR beam) and transmit RARs separately (e.g., in TDM manner) in separate RAR windows. In certain configurations, the two RAR windows may not overlap in time, e.g., the RARs may be time division multiplexed or transmitted in an interleaved pattern.

In certain other configurations, the base station may transmit a single RAR in response to multiple concurrent PRACH transmissions. If an additional message is not encoded into multiple concurrent PRACH transmission, then a single RAR may be sufficient to indicate the RACH process is successful to the UE. Additionally and/or alternatively, the base station may transmit separate RAR messages for multiple concurrent PRACH transmissions, and the UE may decide whether the RACH process is successful when at least one RAR message is received.

Figure 6A:
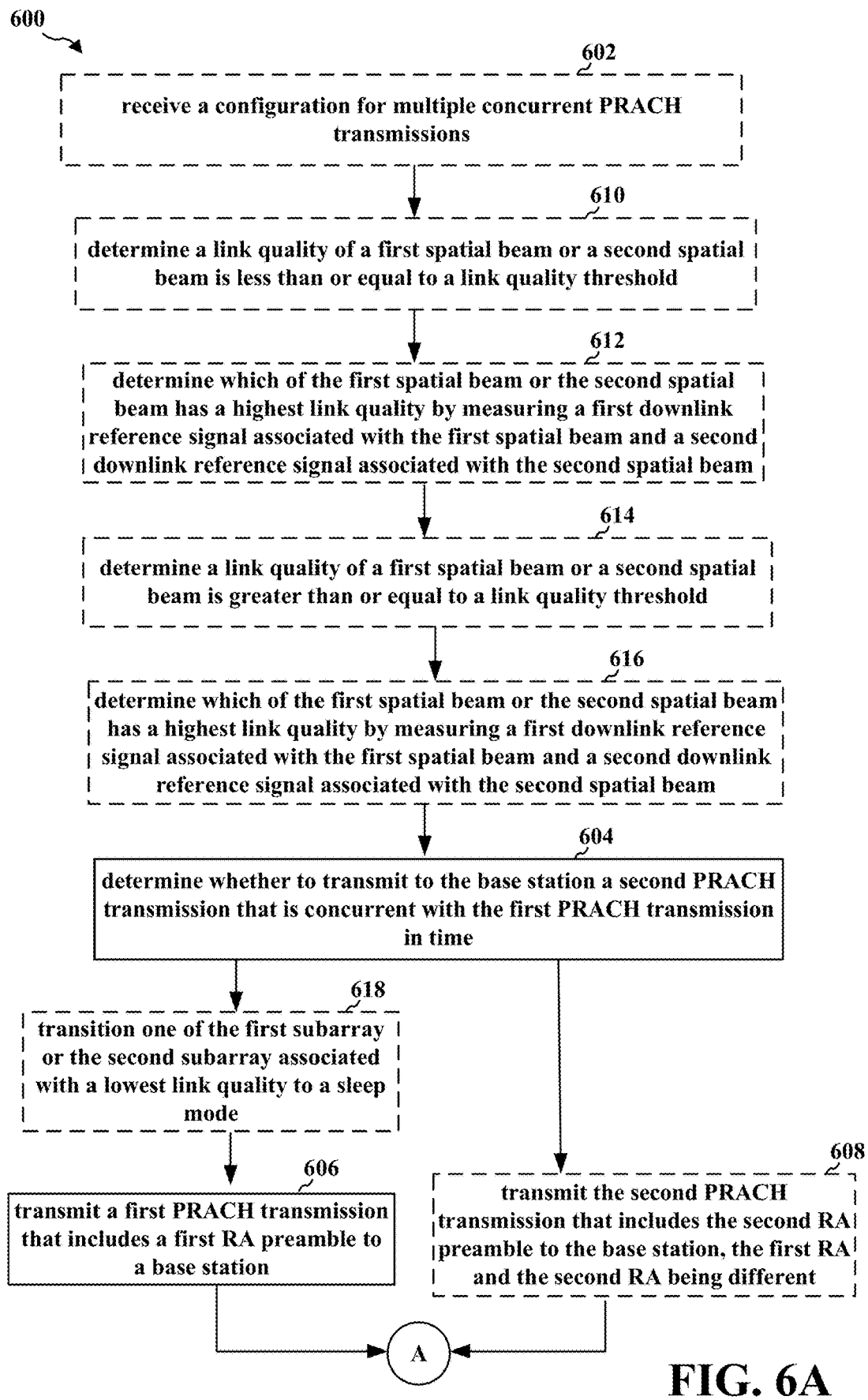
FIGS. 6A and 6B are a flowchart of a method of wireless communication.
Figure 6B:
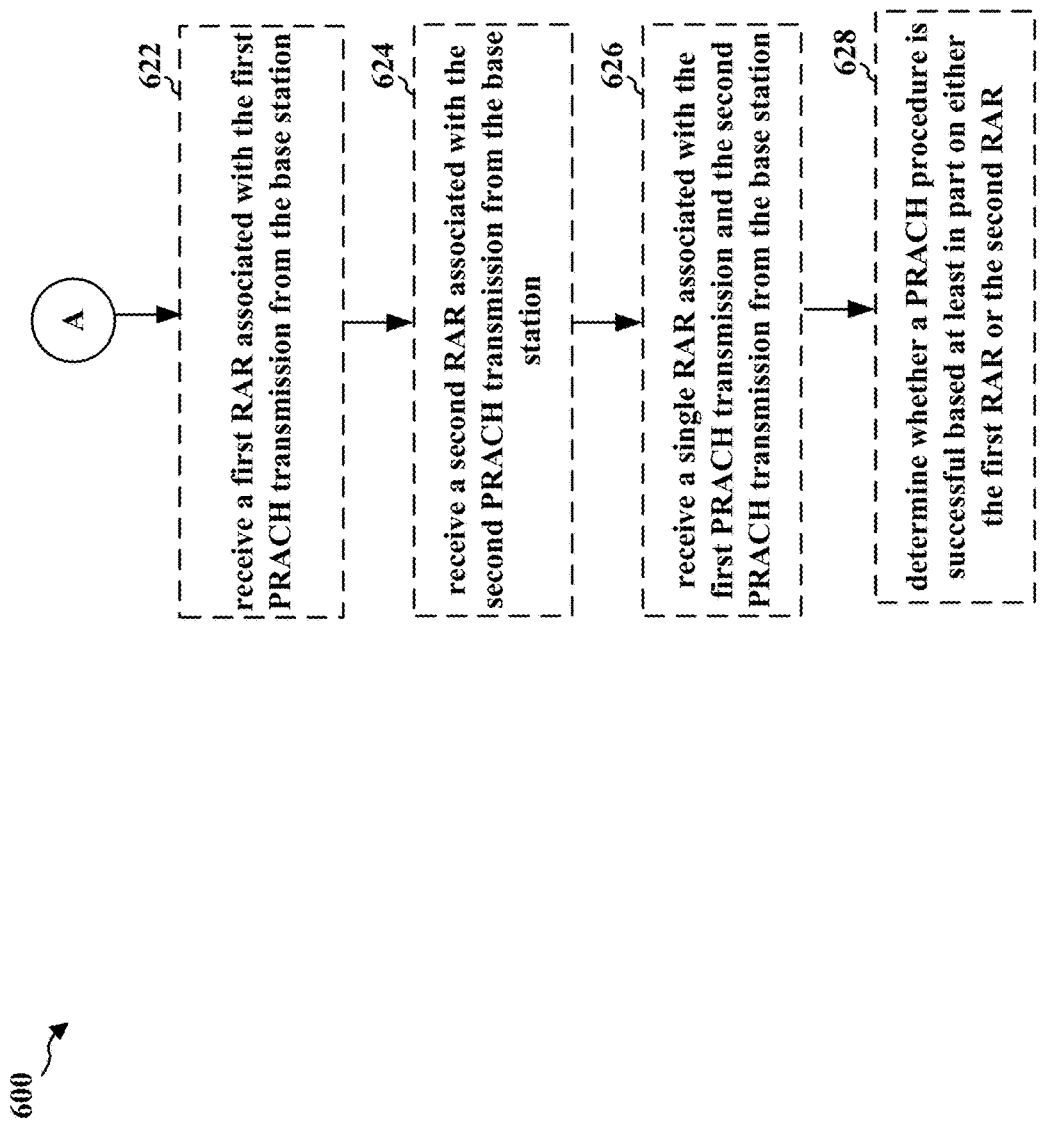

FIGS. 6A and 6B are a flowchart 600 of a method of wireless communication. The method may be performed by a UE (e.g., the UE 104, 350, 404, 500, 515, 550, the apparatus 702/702'). In FIGS. 6A and 6B, optional operations are indicated with dashed lines.

Referring to FIG. 6A, at 602, the UE may receive a configuration for multiple concurrent PRACH transmissions. In certain aspects, the configuration may comprise at least one of an indication that the multiple concurrent PRACH transmissions are allowed for the UE, a number of the multiple concurrent PRACH transmissions that may be allowed for the UE, a set of preamble indices that may be configured for the multiple concurrent PRACH transmissions, and a transmission power for the multiple concurrent PRACH transmissions. In certain other aspects, the configuration may be based on a UE capability. For example, referring to any of FIGS. 5C-5E, the base station 555 may configure the UE 550 to transmit multiple concurrent PRACH transmissions within the same RAR window by sending configuration information with RRC signaling that is received by the UE 550. The configuration of multiple concurrent PRACH transmissions may depend on the UE's 550 capability, e.g., whether the UE is configured for concurrent PRACH transmissions, the number of concurrent PRACH transmissions the UE is capable of transmitting, the preamble indices, transmission power, etc.

At 604, the UE may transmit a first PRACH transmission that includes a first RA preamble to a base station. For example, referring to FIG. 5A, the UE 500 may transmit a first PRACH transmission that may be associated with a first beam 504a that is beamformed using the first antenna subarray 502a with the first polarization.

At 606, the UE may determine whether to transmit to the base station a second PRACH transmission that is concurrent with the first PRACH transmission in time. In certain aspects, the second PRACH may include a second RA preamble. In certain aspects, the UE may determine whether to concurrently transmit the first PRACH transmission and the second PRACH transmission based at least in part on one or more channel conditions or a power state of the UE. In certain other aspects, the one or more channel conditions may include at least one of a RSRP of one or more reference signals received from the base station, a pathloss estimate, or a power state of the UE. For example, referring to FIG. 5D, the UE 550 may determine whether to transmit multiple concurrent PRACH transmissions or a single PRACH transmission depending on certain conditions, e.g., channel conditions related to RSRP, pathloss estimate, a power state of the UE), and so forth.

At 608, the UE may transmit the second PRACH transmission that includes the second RA preamble to the base station. In certain aspects, the first RA preamble and the second RA preamble may be different. In certain other aspects, the first RA preamble and the second RA preamble may be concurrently transmitted in a same RACH occasion or in different RACH occasions that overlap in time. In certain other aspects, the first PRACH transmission and the second PRACH transmission may be associated with different RA preamble indices. In certain other aspects, the first PRACH transmission and the second PRACH transmission may be associated with different transmission beams. In certain other aspects, the first PRACH transmission may be transmitted using a first spatial beam beamformed using a first antenna subarray. In certain other aspects, the second PRACH transmission may be transmitted using a second spatial beam beamformed using a second antenna subarray. In certain other aspects, the first antenna subarray may be associated with a first polarization. In certain other aspects, the second antenna subarray may be associated with a second polarization. In certain other aspects, the first antenna subarray and the second antenna subarray may be associated with a same antenna module. In certain other aspects, the first antenna subarray may be associated with a first antenna module. In certain other aspects, the second antenna subarray is associated with a second antenna module. In certain other aspects, the first antenna module and the second antenna module facing different directions. In certain other aspects, the first PRACH transmission and the second PRACH transmission are beamformed using a same spatial beam. For example, referring to FIG. 5A, the UE 500 may transmit a second PRACH transmission that may be associated with a second beam 504b that is beamformed using the second antenna subarray 502b with the second polarization. The first PRACH transmission and the second PRACH transmission may include different RA preambles, and may be transmitted concurrently by the first antenna subarray 502a and the second antenna subarray 502b using the same RACH occasion or in different RACH occasions that overlap in time. Referring to FIG. 5B, the UE 515 may include a first antenna module 506a that includes a first antenna subarray 508a, and a second antenna module 506b that includes a second antenna subarray 508b. A first PRACH transmission may be associated with a first beam 510a that is beamformed using the first antenna subarray 508a at the first antenna module 506a. A second PRACH transmission may be associated with a second beam 510b that is beamformed using the second antenna subarray 508b at the second antenna module 506b. The first PRACH transmission and the second PRACH transmission may include different RA preambles, and may be transmitted concurrently by the first antenna subarray 508a and the second antenna subarray 508b. Referring to FIG. 5C, the UE 550 may beamform both antenna subarrays 502a, 502b using the beam with the highest link quality. Beamforming using the same beam implies that both beams 504a, 504b transmitted by both antenna subarrays 502a, 502b have the same steering angles, angular width, etc.

In certain aspects of 608, multiple RSs may be associated with the same PRACH occasion. In certain other aspects, the first spatial beam and the second spatial beam are selected from a plurality of spatial beams based at least in part on the multiple RSs. In certain other aspects, the multiple reference signals include one or more of CSI-RSs or SSBs. In certain other aspects, a first RACH occasion associated with the first beam and a second RACH occasion associated with a second beam are concurrent in time. In certain other aspects, the first RA preamble associated with the first beam and the second RA preamble associated with the second beam are concurrent in time. In certain other aspects, a first link quality associated with the first beam and a second link quality associated with the second beam may both be greater than or equal to a RSRP threshold. In certain other aspects, when a link quality associated with each of the multiple RSs is less than or equal to a RSRP threshold, any two of the multiple RSs may be selected for a concurrent Msg1 transmission. In certain other aspects, a first RSRP threshold associated with selecting multiple beams is different than a second RSRP threshold associated with selecting a single beam. For example, referring to FIG. 5E, if the UE 550 receives multiple RSs (e.g., CSI-RSs and/or SSBs) for a single RACH occasion or for multiple frequency division multiplexed RACH occasions from the base station 555, the UE 550 may be able to determine multiple beams (e.g., beam with the highest link quality and the beam with the second highest link quality) for concurrent PRACH transmissions. When the UE 550 transmits concurrent PRACH transmissions using the same PRACH occasion or multiple frequency division multiplexed PRACH occasions, the concurrent PRACH transmissions undergo different propagation paths, and hence, are more reliable and robust to beam blocking of one of the paths. When the first beam 504a scatters off the scattering object 565, the first beam 504a may be provided with a second path (e.g., the reflecting beam 504c), and hence, the chance of a successful RA procedure may be increased. The UE 550 may select two RACH occasions and/or RA preambles that overlap in the time domain. The UE 550 may select two RACH occasions and/or RA preambles that overlap in the time domain. The beams selected by the UE 550 may be referred to as suitable beams, e.g., meaning that the selected beams may satisfy an RSRP threshold configured by the network. When the RSRP corresponding to all SSBs and/or CSI-RS sent by the base station 555 are below the RSRP threshold, UE 550 might select any two SSBs and/or CSI-RS for concurrent PRACH transmissions with different RA preambles (e.g., Msg 1). The RSRP threshold configured by the network may be different when the UE 550 selects a single beam for a single PRACH transmission verses when the UE 550 selects multiple beams for concurrent PRACH transmissions.

In certain other aspects of 608, one or more of the first PRACH transmission or the second PRACH transmission may include one or more bits of an encoded message. In certain other aspects, the one or more bits of the encoded message may convey information associated with one or more of a buffer status report or a power headroom report. In certain other aspects, the base station may configure the UE with a first set of PRACH occasions and the first RA preamble for the first PRACH transmission. In certain other aspects, the first set of PRACH occasions and the first RA preamble are associated with a first SSBs. In certain other aspects, the base station may configure the UE with a second set of PRACH occasions and the second RACH preamble for the second PRACH transmission. In certain other aspects, the second set of PRACH occasions and the second RA preamble may be associated with a second SSB. In certain other aspects, the first set of PRACH occasions and the second set of PRACH occasions may overlap in the time domain. In certain other aspects, the message may be conveyed based at least in part on a selection from the first set of PRACH occasions and the second set of PRACH occasions. In certain other aspects, the base station may configure the UE with a first set of preambles for a first beam associated with the first PRACH transmission and a second set of preambles for a second beam associated with the second PRACH transmission. In certain other aspects, the message may be conveyed based at least in part upon a selection from the first set of preambles and the second set of preambles. For example, referring to FIG. 5A, the network may configure eight RACH occasions (e.g., a first set of PRACH occasions) and one RA preamble for CFRA corresponding to a first SSB. The network may also configure another eight RACH occasions (e.g., a second set of PRACH occasions) and another RA preamble for CFRA corresponding to a second SSB. The first and second set of RACH occasions may overlap in the time domain. Hence, the UE 500 has sixty-four choices for RACH occasion pairs to transmit simultaneous PRACH transmissions, and may convey six additional bits to the network through this selection. In certain other configurations, the UE 500 may encode a few bits of a message into the concurrent PRACH transmissions based on the selection of RA preambles included in the PRACH transmission. For example, the network may configure the UE 500 with a set of RA preambles for each beam, e.g., corresponding to different SSBs and/or CSI-RSs. The UE 500 may convey additional bits of a message in the PRACH transmissions based at least in part on the selection of the RA preambles. In certain configurations, the message may convey information about the UE 500, e.g., such as buffer status report and/or power headroom report from the UE.

At 610, the UE may determine a link quality of a first spatial beam or a second spatial beam is less than or equal to a link quality threshold. For example, referring to FIG. 5C, the UE 550 may determine that a link quality (e.g., signal strength, RSSI, RSRP, etc.) of the beams illustrated in FIG. 5A may be lower than a link quality threshold.

At 612, the UE may determine which of the first spatial beam or the second spatial beam has a highest link quality by measuring a first downlink reference signal associated with the first spatial beam and a second downlink reference signal associated with the second spatial beam. In certain aspects, the same spatial beam on which the first PRACH transmission and the second PRACH transmission are beamformed is the first spatial beam or the second spatial beam with the highest link quality. In certain other aspects, the first PRACH transmission and the second PRACH transmission may be transmitted using at least one of a same steering angle or angular width. For example, referring to FIG. 5C, the UE 550 may determine the beam with the highest link quality by measuring the downlink reference signal (DL RS) for each beam. The UE 550 may beamform both antenna subarrays 502a, 502b using the beam with the highest link quality. Beamforming using the same beam implies that both beams 504a, 504b transmitted by both antenna subarrays 502a, 502b have the same steering angles, angular width, etc.

At 614, the UE may determine a link quality of a first spatial beam or a second spatial beam is greater than or equal to a link quality threshold. For example, referring to FIG. 5D, in scenarios in which the UE 550 determines that the link quality is above a link quality threshold, the UE 550 may not need to take advantage of multipath diversity provided by concurrent PRACH transmission in order to perform a successful RA procedure.

Referring to FIG. 6B, at 616, the UE may determine which of the first spatial beam or the second spatial beam has a highest link quality by measuring a first downlink reference signal associated with the first spatial beam and a second downlink reference signal associated with the second spatial beam. For example, referring to FIG. 5D, the beam

504*a* that is selected for the single PRACH transmission may be the beam with the highest link quality and/or a suitable beam. The beam 504*a* with the highest link quality may be determined by measuring DL RS for each beam.

At 618, the UE may transition one of the first subarray or the second subarray to a sleep mode. For example, referring to FIG. 5D, the UE 550 may transition the second subarray 502*b* to sleep mode and/or reduced power mode in order to conserve power.

At 620, the UE may transmit a single PRACH transmission using a single spatial beam based on the spatial beam having a link quality greater than or equal to a link quality threshold. In certain aspects, the single spatial beam includes a SSB or CSI-RS whose RSRP is greater than or equal to the link quality threshold. In certain other aspects, the single spatial beam includes a SSB or channel state information CSI-RS when other spatial beams whose RSRP are less than or equal to the link quality threshold. For example, referring to FIG. 5D, the UE 550 may beamform a single antenna subarray 502*a* in order to transmit a single PRACH transmission using beam 504*a*. The beam 504*a* that is selected for the single PRACH transmission may be the beam with the highest link quality and/or a suitable beam. The beam 504*a* with the highest link quality may be determined by measuring DL RS for each beam. A suitable beam may refer to an SSB and/or CSI-RS whose corresponding RSRP is greater than a network configured threshold. Additionally and/or alternatively, a suitable beam may refer to a beam corresponding to any SSB and/or CSI-RS when the corresponding RSRP of all SSB and/or CSI-RS are below the network configured threshold.

At 622, the UE may receive a RAR associated with the first PRACH transmission from the base station. In certain aspects, the first RAR may include a first PDCCH transmission and a first PDSCH transmission which may convey the first RAR. For example, referring to FIG. 5E, the base station 555 may send a separate RAR for each of the concurrent PRACH transmissions sent by the UE 550. For example, in the case of two concurrent PRACH transmissions, two RAR messages each with an associated PDCCH and PDSCH may be transmitted to the UE 550.

At 624, the UE may receive a second RAR associated with the second PRACH transmission from the base station. In certain other aspects, the second RAR may include a second PDCCH transmission and a second PDSCH transmission which may convey the second RAR. For example, referring to FIG. 5E, the base station 555 may send a separate RAR (not illustrated in FIG. 5E) for each of the concurrent PRACH transmissions sent by the UE 550. For example, in the case of two concurrent PRACH transmissions, two RAR messages (not illustrated in FIG. 5E) each with an associated PDCCH and PDSCH may be transmitted to the UE 550.

In certain aspects of 624, the first RAR may be received via a first beam and the second RAR is received via a second beam. In certain other aspects, the first beam and the second beam may be quasi-collocated with a downlink reference signal associated with a corresponding PRACH resource. In certain other aspects, the first RAR and the second RAR may be received in a same RAR window. For example, referring to FIG. 5E, the beam (not illustrated in FIG. 5E) for each RAR transmission may be quasi-collocated with the DL RS associated with the corresponding PRACH resource of the associated PRACH transmission. If the UE 550 is configured to receive two RAR beams concurrently, the base station 555 may concurrently transmit the two RARs in the same RAR window.

In certain other aspects of 624, the first RAR may be received in a first RAR window and the second RAR may be received in a second RAR window. In certain aspects, the first RAR and the second RAR may be time division multiplexed or received in an interleaved pattern. For example, referring to FIG. 5E, if the UE 550 is not configured to receive multiple RAR beams concurrently, the base station 555 may configure two RAR windows (e.g., one for each RAR beam) and transmit RARs (not illustrated in FIG. 5E) separately (e.g., in TDM manner) in separate RAR windows (not illustrated in FIG. 5E). In certain configurations, the two RAR windows may not overlap in time, e.g., the RARs may be time division multiplexed or transmitted in an interleaved pattern.

At 626, the UE may receive a single RAR associated with the first PRACH transmission and the second PRACH transmission from the base station. In certain aspects, the single RAR associated with the first PRACH transmission and the second PRACH transmission may be received when the first PRACH transmission and the second PRACH transmission do not include an encoded message. For example, referring to FIG. 5E, the base station 555 may transmit a single RAR (not illustrated in FIG. 5E) in response to multiple concurrent PRACH transmissions. If an additional message is not encoded into multiple concurrent PRACH transmission, then a single RAR may be sufficient to indicate the RACH process is successful to the UE 550.

At 628, the UE may determine whether a RA procedure is successful based at least in part on either the first RAR or the second RAR. For example, referring to FIG. 5E, once at least one RAR (not illustrated in FIG. 5E) is received, the UE 550 may determine that the RACH process is successful.

Figure 7:
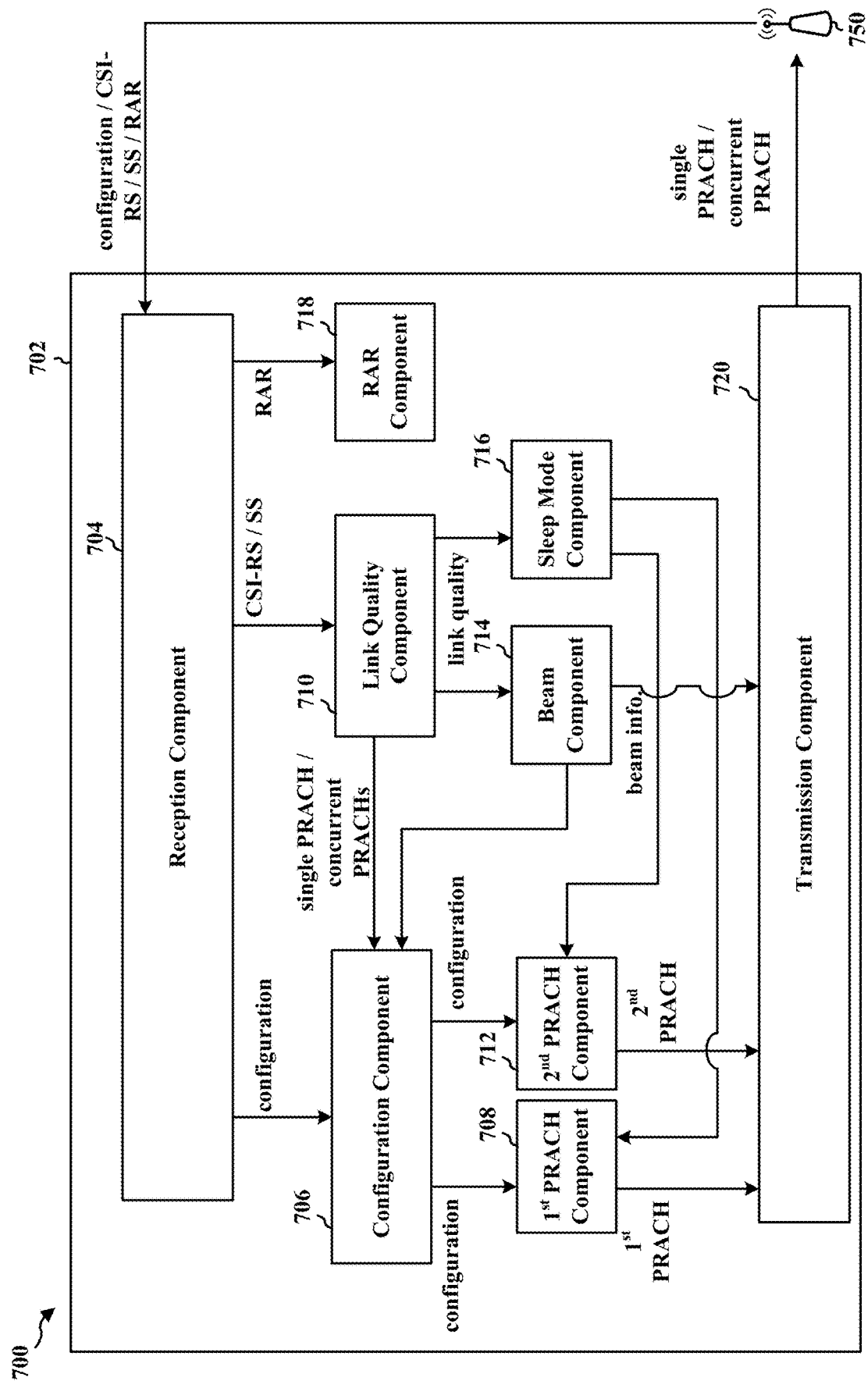
FIG. 7 is a conceptual data flow diagram illustrating the data flow between different means/components in an example apparatus.

FIG. 7 is a conceptual data flow diagram 700 illustrating the data flow between different means/components in an exemplary apparatus 702. The apparatus may be a UE (e.g., the UE 104, 350, 404, 500, 515, 550, the apparatus 702') in communication with a base station 750 (e.g., the base station 102, 180, 310, 555). The apparatus may include a reception component 704, a configuration component 706, a first PRACH component 708, a link quality component 710, a second PRACH component 712, a beam component 714, a sleep mode component 716, a RAR component, and a transmission component 720.

The reception component 704 may be configured to receive a configuration for multiple concurrent PRACH transmissions. In certain aspects, the configuration may comprise at least one of an indication that the multiple concurrent PRACH transmissions are allowed for the UE, a number of the multiple concurrent PRACH transmissions that may be allowed for the UE, a set of preamble indices that may be configured for the multiple concurrent PRACH transmissions, and a transmission power for the multiple concurrent PRACH transmissions. In certain other aspects, the configuration may be based on a UE capability. The reception component 704 may be configured to send the configuration to the configuration component 706.

The reception component 704 may be configured to receive one or more of CSI-RS, DL RS, and/or SS, and may be configured to send the CSI-RS, DL RS, and/or SS to the link quality component 710.

The link quality component 710 may be configured to determine whether to transmit to the base station a second PRACH transmission that is concurrent with the first PRACH transmission in time. In certain aspects, the second PRACH may include a second RA preamble. In certain aspects, the UE may determine whether to concurrently transmit the first PRACH transmission and the second PRACH transmission based at least in part on one or more channel conditions or a power state of the UE. In certain other aspects, the one or more channel conditions may include at least one of a RSRP of one or more reference signals received from the base station, a pathloss estimate, or a power state of the UE. The link quality component 710 may be configured to send information indicating whether a single PRACH transmission or multiple concurrent PRACH transmissions to the configuration component 706. The configuration component 706 may be configured to send configuration information and single or multiple PRACH transmission information to one or more of the first PRACH component 708 and the second PRACH component 712.

The first PRACH component 708 may be configured to generate a first PRACH transmission that is sent to the transmission component 720. The second PRACH component 712 may be configured to generate a second PRACH transmission that is sent to the transmission component 720.

The link quality component 710 may be configured to determine a link quality of a first spatial beam or a second spatial beam is less than or equal to a link quality threshold. The link quality component 710 may be configured to determine which of the first spatial beam or the second spatial beam has a highest link quality by measuring a first downlink reference signal associated with the first spatial beam and a second downlink reference signal associated with the second spatial beam. In certain aspects, the same spatial beam on which the first PRACH transmission and the second PRACH transmission are beamformed is the first spatial beam or the second spatial beam with the highest link quality. In certain other aspects, the first PRACH transmission and the second PRACH transmission may be transmitted using at least one of a same steering angle or angular width. The link quality component 710 may be configured to determine a link quality of a first spatial beam or a second spatial beam is greater than or equal to a link quality threshold. The link quality component 710 may be configured to determine which of the first spatial beam or the second spatial beam has a highest link quality by measuring a first downlink reference signal associated with the first spatial beam and a second downlink reference signal associated with the second spatial beam. The link quality component may be configured to send information associated with the link quality of different spatial beams to the beam component 714 and/or sleep mode component 716. The beam component 714 may be configured to send beam information to the transmission component 720.

The transmission component 720 may be configured to transmit a first PRACH transmission that includes a first RA preamble to a base station 750, as described in connection with 606 in FIG. 6A. The transmission component 720 may be configured to transmit the second PRACH transmission that includes the second RA preamble to the base station, e.g., as described in connection with 608 in FIG. 6A. In certain aspects, the first RA preamble and the second RA preamble may be different. In certain other aspects, the first RA preamble and the second RA preamble may be concurrently transmitted in a same RACH occasion or in different RACH occasions that overlap in time. In certain other aspects, the first PRACH transmission and the second PRACH transmission may be associated with different RA preamble indices. In certain other aspects, the first PRACH transmission and the second PRACH transmission may be associated with different transmission beams. In certain other aspects, the first PRACH transmission may be transmitted using a first spatial beam beamformed using a first antenna subarray. In certain other aspects, the second PRACH transmission may be transmitted using a second spatial beam beamformed using a second antenna subarray. In certain other aspects, the first antenna subarray may be associated with a first polarization. In certain other aspects, the second antenna subarray may be associated with a second polarization. In certain other aspects, the first antenna subarray and the second antenna subarray may be associated with a same antenna module. In certain other aspects, the first antenna subarray may be associated with a first antenna module. In certain other aspects, the second antenna subarray is associated with a second antenna module. In certain other aspects, the first antenna module and the second antenna module facing different directions. In certain other aspects, the first PRACH transmission and the second PRACH transmission are beamformed using a same spatial beam. In certain aspects, multiple RSs may be associated with the same PRACH occasion. In certain other aspects, the first spatial beam and the second spatial beam are selected from a plurality of spatial beams based at least in part on the multiple RSs. In certain other aspects, the multiple reference signals include one or more of CSI-RSs or SSBs. In certain other aspects, a first RACH occasion associated with the first beam and a second RACH occasion associated with a second beam are concurrent in time. In certain other aspects, the first RA preamble associated with the first beam and the second RA preamble associated with the second beam are concurrent in time. In certain other aspects, a first link quality associated with the first beam and a second link quality associated with the second beam may both be greater than or equal to a RSRP threshold. In certain other aspects, when a link quality associated with each of the multiple RSs is less than or equal to a RSRP threshold, any two of the multiple RSs may be selected for a concurrent Msg1 transmission. In certain other aspects, a first RSRP threshold associated with selecting multiple beams is different than a second RSRP threshold associated with selecting a single beam. In certain other aspects, one or more of the first PRACH transmission or the second PRACH transmission may include one or more bits of an encoded message. In certain other aspects, the one or more bits of the encoded message may convey information associated with one or more of a buffer status report or a power headroom report. In certain other aspects, the base station may configure the UE with a first set of PRACH occasions and the first RA preamble for the first PRACH transmission. In certain other aspects, the first set of PRACH occasions and the first RA preamble are associated with a first SSBs. In certain other aspects, the base station may configure the UE with a second set of PRACH occasions and the second RACH preamble for the second PRACH transmission. In certain other aspects, the second set of PRACH occasions and the second RA preamble may be associated with a second SSB. In certain other aspects, the first set of PRACH occasions and the second set of PRACH occasions may overlap in the time domain. In certain other aspects, the message may be conveyed based at least in part on a selection from the first set of PRACH occasions and the second set of PRACH occasions. In certain other aspects, the base station may configure the UE with a first set of preambles for a first beam associated with the first PRACH transmission and a second set of preambles for a second beam associated with the second PRACH transmission. In certain other aspects, the message may be conveyed based at least in part upon a selection from the first set of preambles and the second set of preambles.

The sleep mode component 716 may be configured to transition one of the first subarray or the second subarray to a sleep mode. The sleep mode component 716 may be configured to send a signal to either the first PRACH component 708 or the second PRACH component 712 to transition one to sleep mode.

The transmission component 720 may be configured to transmit a single PRACH transmission using a single spatial beam based on the spatial beam having a link quality greater than or equal to a link quality threshold, e.g., as described in connection with 606 in FIG. 6A. In certain aspects, the single spatial beam includes a SSB or CSI-RS whose RSRP is greater than or equal to the link quality threshold. In certain other aspects, the single spatial beam includes a SSB or channel state information CSI-RS when other spatial beams whose RSRP are less than or equal to the link quality threshold.

The reception component 704 may be configured to receive a RAR associated with the first PRACH transmission from the base station, as described in connection with 622, 624, 626 of FIG. 6B. In certain aspects, the first RAR may include a first PDCCH transmission and a first PDSCH transmission which may convey the first RAR. The reception component 704 may be configured to receive a second RAR associated with the second PRACH transmission from the base station. In certain other aspects, the second RAR may include a second PDCCH transmission and a second PDSCH transmission which may convey the second RAR. In certain aspects, the first RAR may be received via a first beam and the second RAR is received via a second beam. In certain other aspects, the first beam and the second beam may be quasi-collocated with a downlink reference signal associated with a corresponding PRACH resource. In certain other aspects, the first RAR and the second RAR may be received in a same RAR window. In certain other aspects, the first RAR may be received in a first RAR window and the second RAR may be received in a second RAR window. In certain aspects, the first RAR and the second RAR may be time division multiplexed or received in an interleaved pattern. The reception component 704 may be configured to receive a single RAR associated with the first PRACH transmission and the second PRACH transmission from the base station. In certain aspects, the single RAR associated with the first PRACH transmission and the second PRACH transmission may be received when the first PRACH transmission and the second PRACH transmission do not include an encoded message. The reception component 704 may be configured to send information associated with the one or more RARs to the RAR component 718.

The RAR component 718 may be configured to determine whether a RA procedure is successful based at least in part on either the first RAR or the second RAR.

The apparatus may include additional components that perform each of the blocks of the algorithm in the aforementioned flowcharts of FIGS. 6A and 6B. As such, each block in the aforementioned flowcharts of FIGS. 6A and 6B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
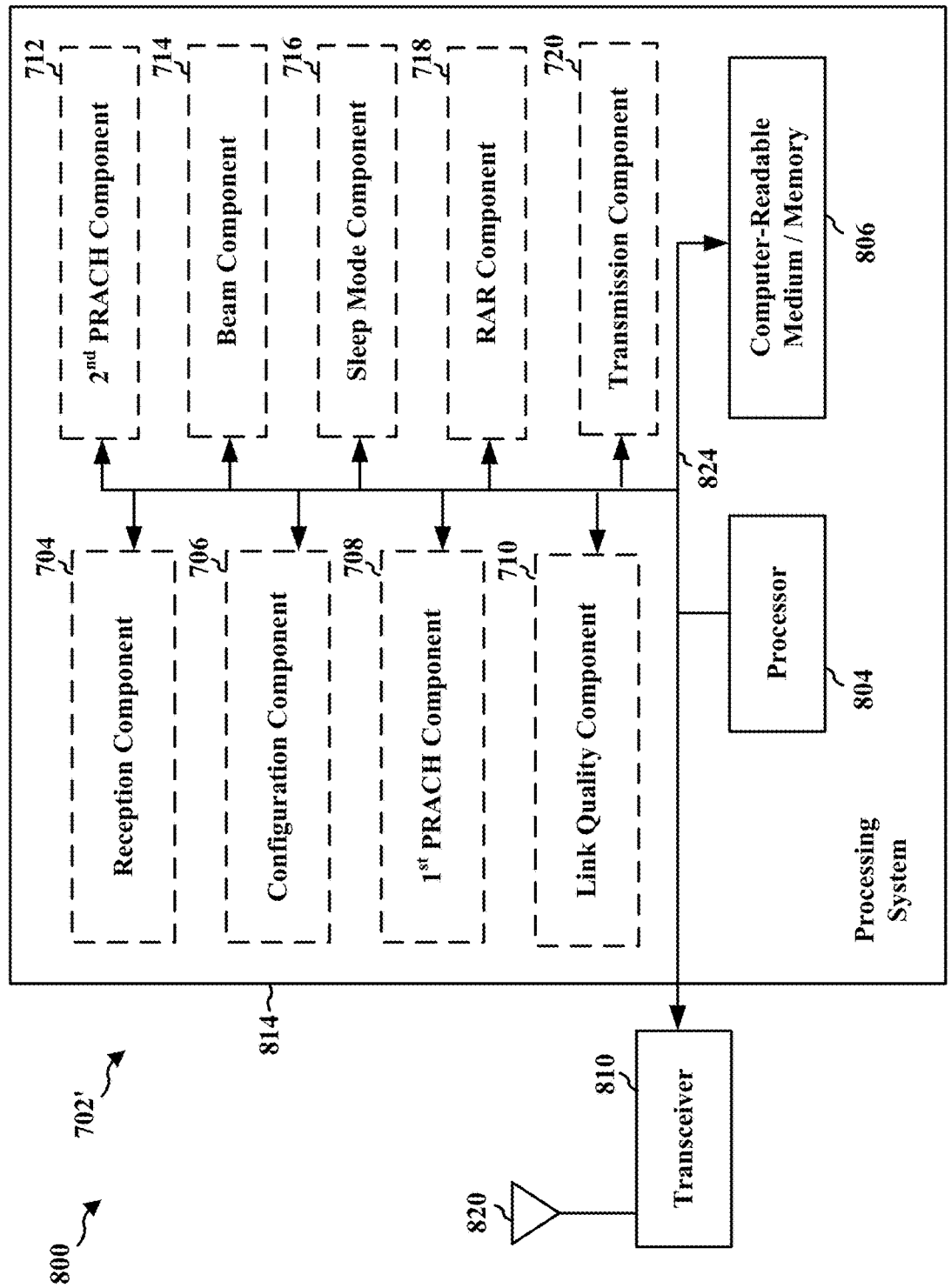
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 720, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for transmitting, to a base station, a first PRACH transmission that includes a first RA preamble. The apparatus 702/702' includes means for determining whether to transmit, to the base station, a second PRACH transmission that is concurrent with the first PRACH transmission, and the second PRACH transmission includes a second RA preamble.

The apparatus 702/702' may include means for transmitting, to the base station, the second PRACH transmission that includes the second RA preamble when the second PRACH transmission is determined to be transmitted, and the first RA preamble and the second RA preamble are different, and the first RA preamble and the second RA preamble are concurrently transmitted in a same PRACH occasion or in different PRACH occasions that overlap in time.

In one aspect, the first PRACH transmission and the second PRACH transmission are associated with different RA preamble indices, or the first PRACH transmission and the second PRACH transmission are associated with different transmission beams.

The apparatus 702/702' may further include means for receiving, from the base station, a configuration for multiple concurrent PRACH transmissions, wherein the configuration comprises at least one of an indication that the multiple concurrent PRACH transmissions are allowed for the UE, a number of the multiple concurrent PRACH transmissions that is allowed for the UE, a set of preamble indices configured for the multiple concurrent PRACH transmissions, or a transmission power for the multiple concurrent PRACH transmissions. In one aspect, the configuration is based on at least one of a UE capability or UE assistance information.

In one aspect, the determining whether to concurrently transmit the first PRACH transmission and the second PRACH transmission is based on at least one of one or more channel conditions or a power state of the UE. In one aspect, the one or more channel conditions include at least one of an RSRP of one or more reference signals received from the base station or a pathloss estimate.

In one aspect, the first PRACH transmission is transmitted using a first spatial beam beamformed using a first antenna subarray, and the second PRACH transmission is transmitted using a second spatial beam beamformed using a second antenna subarray. In one aspect, the first PRACH transmission and the second PRACH transmission are beamformed using a same spatial beam.

In one aspect, one or more of the first PRACH transmission or the second PRACH transmission include one or more bits of an encoded message, the one or more bits of the encoded message indicating information associated with at least one of a buffer status report or a power headroom report.

In one aspect, the apparatus 702/702' may further include means for receiving a first RAR associated with the first PRACH transmission, and means for receiving a second RAR associated with the second PRACH transmission. In one aspect, the apparatus 702/702' may include means for receiving a single RAR associated with the first PRACH transmission and the second PRACH transmission from the base station.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving, from a first base station, a configuration for multiple concurrent PRACH transmissions based on at least one of UE capability information or UE assistance information transmitted to the first base station;
   transmitting, to the first base station, a first physical random access channel (PRACH) transmission that includes a first random access (RA) preamble; and
   determining whether to transmit, to the first base station, a second PRACH transmission that is concurrent with the first PRACH transmission based on the configuration for multiple concurrent PRACH transmissions, wherein the second PRACH transmission includes a second RA preamble, wherein the first RA preamble and the second RA preamble are different.

2. The method of claim 1, further comprising:
   transmitting, to the first base station, the second PRACH transmission that includes the second RA preamble when the second PRACH transmission is determined to be transmitted, wherein the first RA preamble and the second RA preamble are concurrently transmitted in a same PRACH occasion or in different PRACH occasions that overlap in time.

3. The method of claim 2, wherein:
   the first PRACH transmission and the second PRACH transmission are associated with different RA preamble indices, or
   the first PRACH transmission and the second PRACH transmission are associated with different transmission beams.

4. The method of claim 2, wherein:
   the first PRACH transmission is transmitted using a first spatial beam beamformed using a first antenna subarray, and the second PRACH transmission is transmitted using a second spatial beam beamformed using a second antenna subarray.

5. The method of claim 2, wherein the first PRACH transmission and the second PRACH transmission are beamformed using a same spatial beam.

6. The method of claim 2, wherein one or more of the first PRACH transmission or the second PRACH transmission include one or more bits of an encoded message, the one or more bits of the encoded message indicating information associated with at least one of a buffer status report or a power headroom report.

7. The method of claim 2, further comprising:
receiving a first RA response (RAR) associated with the first PRACH transmission; and
receiving a second RAR associated with the second PRACH transmission.

8. The method of claim 2, further comprising:
receiving a single RA response (RAR) associated with the first PRACH transmission and the second PRACH transmission from the first base station.

9. The method of claim 1,
wherein the configuration comprises at least one of an indication that the multiple concurrent PRACH transmissions are allowed for the UE, a number of the multiple concurrent PRACH transmissions that is allowed for the UE, a set of preamble indices configured for the multiple concurrent PRACH transmissions, or a transmission power for the multiple concurrent PRACH transmissions.

10. The method of claim 1, wherein the determining whether to concurrently transmit the first PRACH transmission and the second PRACH transmission is based on at least one of one or more channel conditions or a power state of the UE.

11. The method of claim 10, wherein the one or more channel conditions include at least one of a reference signal received power (RSRP) of one or more reference signals received from the first base station or a pathloss estimate.

12. An apparatus for wireless communication, comprising:
a memory; and
at least one processor coupled to the memory and configured to:
receive, from a first base station, a configuration for multiple concurrent PRACH transmissions based on at least one of UE capability information or UE assistance information transmitted to the first base station;
transmit, to the first base station, a first physical random access channel (PRACH) transmission that includes a first random access (RA) preamble; and
determine whether to transmit, to the first base station, a second PRACH transmission that is concurrent with the first PRACH transmission based on the configuration for multiple concurrent PRACH transmissions, wherein the second PRACH transmission includes a second RA preamble.

13. The apparatus of claim 12, wherein the at least one processor is further configured to:
transmit, to the first base station, the second PRACH transmission that includes the second RA preamble when the second PRACH transmission is determined to be transmitted, wherein the first RA preamble and the second RA preamble are different, and the first RA preamble and the second RA preamble are concurrently transmitted in a same PRACH occasion or in different PRACH occasions that overlap in time.

14. The apparatus of claim 13, wherein:
the first PRACH transmission and the second PRACH transmission are associated with different RA preamble indices, or
the first PRACH transmission and the second PRACH transmission are associated with different transmission beams.

15. The apparatus of claim 13, wherein:
the first PRACH transmission is transmitted using a first spatial beam beamformed using a first antenna subarray, and
the second PRACH transmission is transmitted using a second spatial beam beamformed using a second antenna subarray.

16. The apparatus of claim 13, wherein the first PRACH transmission and the second PRACH transmission are beamformed using a same spatial beam.

17. The apparatus of claim 13, wherein one or more of the first PRACH transmission or the second PRACH transmission include one or more bits of an encoded message, the one or more bits of the encoded message indicating information associated with at least one of a buffer status report or a power headroom report.

18. The apparatus of claim 13, wherein the at least one processor is further configured to:
receive a first RA response (RAR) associated with the first PRACH transmission; and
receive a second RAR associated with the second PRACH transmission.

19. The apparatus of claim 13, wherein the at least one processor is further configured to:
receive a single RA response (RAR) associated with the first PRACH transmission and the second PRACH transmission from the first base station.

20. The apparatus of claim 12,
wherein the configuration comprises at least one of an indication that the multiple concurrent PRACH transmissions are allowed for the apparatus, a number of the multiple concurrent PRACH transmissions that is allowed for the apparatus, a set of preamble indices configured for the multiple concurrent PRACH transmissions, or a transmission power for the multiple concurrent PRACH transmissions.

21. The apparatus of claim 12, wherein the determination of whether to concurrently transmit the first PRACH transmission and the second PRACH transmission is based on at least one of one or more channel conditions or a power state of the apparatus.

22. The apparatus of claim 21, wherein the one or more channel conditions include at least one of a reference signal received power (RSRP) of one or more reference signals received from the first base station or a pathloss estimate.

23. An apparatus for wireless communication, comprising:
means for receiving, from a first base station, a configuration for multiple concurrent PRACH transmissions based on at least one of UE capability information or UE assistance information transmitted to the first base station;
means for transmitting, to the first base station, a first physical random access channel (PRACH) transmission that includes a first random access (RA) preamble; and
means for determining whether to transmit, to the first base station, a second PRACH transmission that is concurrent with the first PRACH transmission based on the configuration for multiple concurrent PRACH transmissions, wherein the second PRACH transmission includes a second RA preamble.

24. The apparatus of claim 23, further comprising:
means for transmitting, to the first base station, the second PRACH transmission that includes the second RA preamble when the second PRACH transmission is determined to be transmitted, wherein the first RA preamble and the second RA preamble are different, and the first RA preamble and the second RA preamble are concurrently transmitted in a same PRACH occasion or in different PRACH occasions that overlap in time.

25. The apparatus of claim 24, wherein:
the first PRACH transmission and the second PRACH transmission are associated with different RA preamble indices, or
the first PRACH transmission and the second PRACH transmission are associated with different transmission beams.

26. The apparatus of claim 23,
the configuration comprises at least one of an indication that the multiple concurrent PRACH transmissions are allowed for the UE, a number of the multiple concurrent PRACH transmissions that is allowed for the UE, a set of preamble indices configured for the multiple concurrent PRACH transmissions, or a transmission power for the multiple concurrent PRACH transmissions.

27. A non-transitory computer-readable medium storing computer-executable code for wireless communication by a user equipment (UE), the code when executed by a processor cause the processor to:
receive, from a first base station, a configuration for multiple concurrent PRACH transmissions based on at least one of UE capability information or UE assistance information transmitted to the first base station;
transmit, to the first base station, a first physical random access channel (PRACH) transmission that includes a first random access (RA) preamble; and
determine whether to transmit, to the first base station, a second PRACH transmission that is concurrent with the first PRACH transmission based on the configuration for multiple concurrent PRACH transmissions, wherein the second PRACH transmission includes a second RA preamble.

* * * * *